United States Patent
Ji et al.

(10) Patent No.: US 10,181,309 B2
(45) Date of Patent: Jan. 15, 2019

(54) ELECTRONIC DEVICE CONTROL METHOD AND ELECTRONIC DEVICE

(71) Applicant: Lenovo (Beijing) Co., Ltd., Beijing (CN)

(72) Inventors: Cheng Ji, Beijing (CN); Mei Xiang, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 381 days.

(21) Appl. No.: 14/868,587

(22) Filed: Sep. 29, 2015

(65) Prior Publication Data
US 2016/0350055 A1    Dec. 1, 2016

(30) Foreign Application Priority Data

Jun. 1, 2015  (CN) .......................... 2015 1 0292922
Jun. 11, 2015 (CN) .......................... 2015 1 0319229

(51) Int. Cl.
*G06F 3/00*   (2006.01)
*G09G 5/12*   (2006.01)
*G06F 9/451*  (2018.01)
*G06F 9/44*   (2018.01)
*G06F 3/14*   (2006.01)

(52) U.S. Cl.
CPC ............. *G09G 5/12* (2013.01); *G06F 3/1462* (2013.01); *G06F 9/4445* (2013.01); *G06F 9/452* (2018.02); *G06F 2203/04803* (2013.01); *G09G 2354/00* (2013.01); *G09G 2370/20* (2013.01)

(58) Field of Classification Search
CPC .. G06F 3/04883; G06F 3/1423; G06F 1/1616; G06F 3/017; G06F 3/0481; G06F 1/1641; G06F 3/0488; G06F 3/04886; G06F 3/04842; G06F 3/0486
See application file for complete search history.

(56) References Cited

U.S. PATENT DOCUMENTS

| | | | | |
|---|---|---|---|---|
| 2014/0087654 A1* | 3/2014 | Kiveisha | .............. | H04B 5/0031 455/41.1 |
| 2014/0237514 A1* | 8/2014 | van Hoff | ............... | G06F 3/0481 725/38 |
| 2014/0354566 A1* | 12/2014 | Hirao | .................... | G06F 3/0418 345/173 |
| 2015/0061972 A1* | 3/2015 | Seo | ........................ | G06F 3/0488 345/2.3 |

* cited by examiner

*Primary Examiner* — Di Xiao
(74) *Attorney, Agent, or Firm* — Harness, Dickey & Pierce, P.L.C.

(57) ABSTRACT

An electronic device control method and system are provided. The method includes: receiving, by a first electronic device, a trigger event performed on a display content displayed by the first electronic device, wherein the first electronic device is a mirror device of a mirror system; generating, by the first electronic device, control information according to the trigger event; sending, by the first electronic device, the control information to a second electronic device, wherein the second electronic device is a source device of the mirror system; identifying, by the second electronic device, a target object according to the control information; and performing, by the second electronic device, an operation on the target object.

17 Claims, 16 Drawing Sheets

ELECTRONIC DEVICE CONTROL METHOD AND ELECTRONIC DEVICE

CROSS-REFERENCES TO RELATED APPLICATIONS

The present application claims the priority to Chinese Patent Application No. 201510292922.9, entitled "CONTROL METHOD AND ELECTRONIC DEVICE", filed with the Chinese State Intellectual Property Office on Jun. 1, 2015, and the priority to Chinese Patent Application No. 201510319229.6, entitled "CONTROL METHOD, CONTROL APPARATUS AND ELECTRONIC DEVICE", field with the Chinese State Intellectual Property Office on Jun. 11, 2015, which are incorporated herein by reference in their entireties.

FIELD

The present disclosure relates to the field of an electronic device, an in particular to a control method and an electronic device.

BACKGROUND

With the advancement of the electronic technology, the display-mirror technology is applied to multiple types of electronic devices.

With the display-mirror technology, a picture in a certain apparatus A may be shared with another device, and the other device as a mirror device displays synchronously a content displayed in the apparatus A as a source device. A user can adjust the content displayed in the mirror device by operating the content in the picture displayed in the source device.

However, the user can not quickly select target devices from the sink device and one or more source devices connected to the sink device, and perform file transmission between the selected target devices, thereby resulting in bad experience of the user.

SUMMARY

In view of the above, an object of the present disclosure is to provide an electronic device control method and an electronic device.

According to an embodiment of the present disclosure, an electronic device control method is provided, which includes: receiving, by a first electronic device, a trigger event performed on a mirror content displayed by the first electronic device, wherein the first electronic device is a mirror device of a mirror system; generating, by the first electronic device, control information according to the trigger event; and sending, by the first electronic device, the control information to a second electronic device, to make the second electronic device identifies a target object according to the control information and performs an operation on the target object, wherein the second electronic device is a source device of the mirror system.

According to an embodiment of the present disclosure, another electronic device is provided, which includes: receiving, a second electronic device, control information sent from a first electronic device, wherein the control information is generated by the first electronic device according to a trigger event performed on a mirror content displayed by the first electronic device, wherein the second electronic device is a source device in a mirror system, and the first electronic device is a mirror device in the mirror system; identifying, by the second electronic device, a target object according to the control information; and performing, by the second electronic device, an operation on the target object.

According to an embodiment of the present disclosure, an electronic device is provided, which includes: one or more processor and a memory having processor-executable instructions stored therein, and the instructions when executed by the one or more processors, configure the electronic device to: receive a trigger event performed on a mirror content displayed by the first electronic device, wherein the first electronic device is a mirror device of a mirror system; generate control information according to the trigger event; send the control information to a second electronic device, to make the second electronic device identifies a target object according to the control information and performs an operation on the target object, wherein the second electronic device is a source device of the mirror system.

BRIEF DESCRIPTION OF THE DRAWINGS

In order to illustrate technical solutions in embodiments of the present disclosure or some techniques more clearly, hereinafter drawings to be used for the description of the embodiments are introduced simply. Apparently, the drawings described below only describe some embodiments of the present disclosure. For those skilled in the art, other drawings may be obtained based on these drawings without any creative work.

DETAILED DESCRIPTION OF THE EMBODIMENTS

In order to make the objects, technical solutions and advantages of embodiments of the present disclosure more clearly, hereinafter the technical solutions of the embodiments of the present disclosure are described clearly and completely in conjunction with the drawings of the embodiments of the present disclosure. Apparently, the described embodiments are some of the embodiments of the present disclosure rather than all the embodiments. Any other embodiments obtained based on the embodiments of the present disclosure by those skilled in the art without any creative work fall within the scope of protection of the present disclosure.

Firstly, it should be noted that, in the embodiments of the present disclosure, a first electronic device and a second electronic device form a mirror system; the second electronic device as a source device sends display data to the first electronic device, and the first electronic device displays a display content which is the same as a display content displayed by the second electronic device based on the display data.

A control method according to the embodiments of the present disclosure is applied to the first electronic device. The first electronic device as a mirror device receives display data sent from a second electronic device corresponding to the first electronic device, and displays a first display content based on the display data. The second display device also displays a second display content based on the display data, and the second display content is the same as the first display content.

There may be one or more second electronic devices. In the case that there is one second electronic device, a whole display region of the first electronic device is used to display the display data sent from the second electronic device; and in the case that there are multiple second electronic devices, the display region of the first electronic device may be divided into multiple regions, and the multiple regions are used to display the display data sent from the second electronic devices respectively.

Figure 1A:
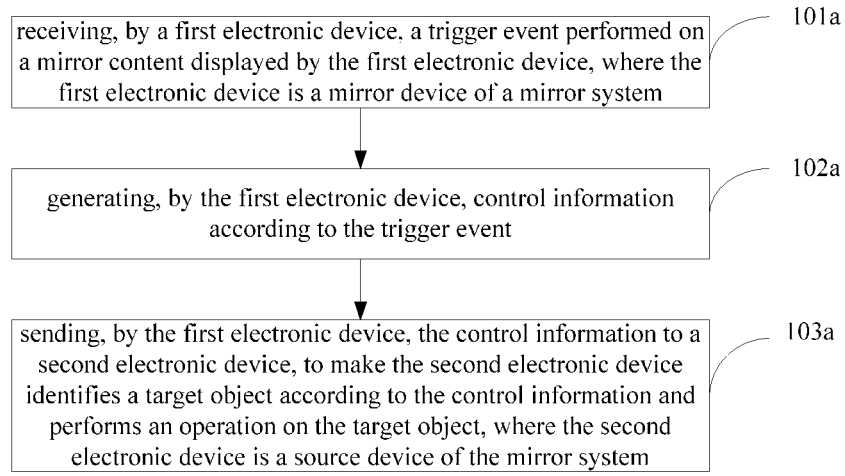
FIG. 1a is a flowchart of an electronic device control method according to an embodiment of the present disclosure.

Reference is made to FIG. 1a, which shows a flowchart of an electronic device control method according to an embodiment of the present disclosure, the method includes steps 101a to 103a.

Step 101a includes: receiving, by a first electronic device, a trigger event performed on a mirror content displayed by the first electronic device, where the first electronic device is a mirror device of a mirror system.

Step 102a includes: generating, by the first electronic device, control information according to the trigger event.

Step 103a includes: sending, by the first electronic device, the control information to a second electronic device, to make the second electronic device identifies a target object according to the control information and performs an operation on the target object, where the second electronic device is a source device of the mirror system.

Figure 1B:
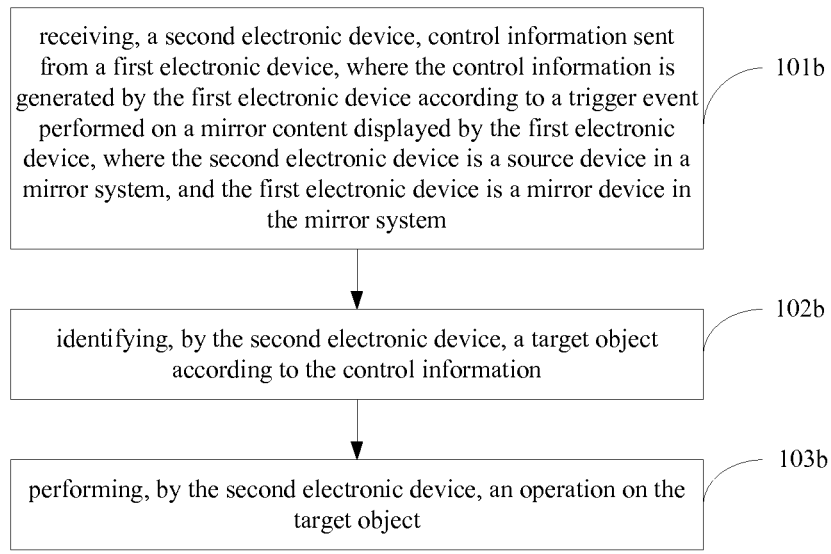
FIG. 1b is a flowchart of an electronic device control method according to an embodiment of the present disclosure.

Reference is made to FIG. 1b, which shows a flowchart of an electronic device control method according to an embodiment of the present disclosure, the method includes steps 101b to 103b.

Step 101b includes: receiving, a second electronic device, control information sent from a first electronic device, where the control information is generated by the first electronic device according to a trigger event performed on a mirror content displayed by the first electronic device, where the second electronic device is a source device in a mirror system, and the first electronic device is a mirror device in the mirror system.

Step 102a includes: identifying, by the second electronic device, a target object according to the control information.

Step 103a includes: performing, by the second electronic device, an operation on the target object.

Figure 2:
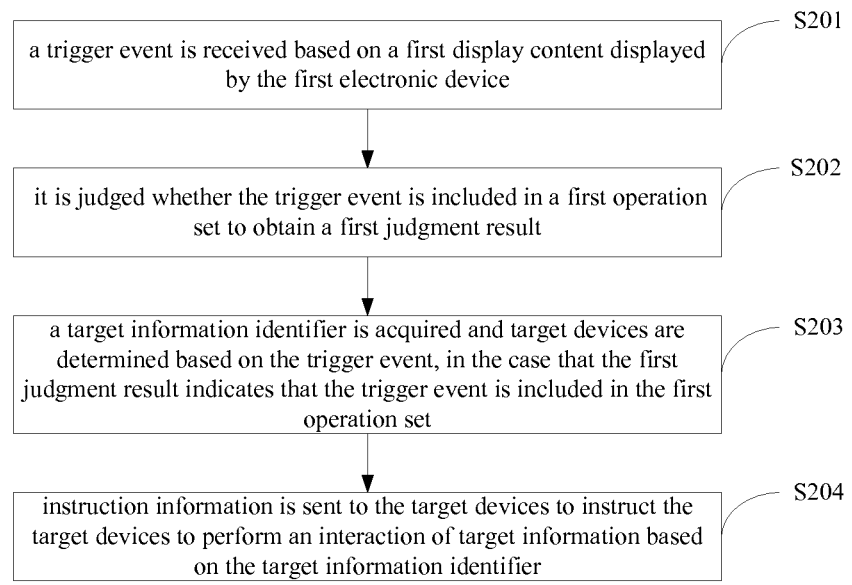
FIG. 2 is a flowchart of an electronic device control method according to an embodiment of the present disclosure.

Reference is made to FIG. 2, which shows a flowchart of an electronic device control method according to an embodiment of the present disclosure. The method is applied to a first electronic device. The first electronic device can receive display data from a second electronic device and perform display based on the display data. The first electronic device may be an electronic device with a large display region, for example a projection device, a desktop computer, a notebook computer, a tablet computer, a mobile phone or a smart television. Accordingly, the second electronic device may be a desktop computer, a notebook computer, a tablet computer, a mobile phone, a smart television, a smart watch or a wearable device.

The method includes step S201 to step S204 hereinafter.

In step S201, a trigger event is received based on a first display content displayed by the first electronic device.

Specifically, the trigger event is an operation performed by an operator on a preset input portion of the first electronic device.

The preset input portion may be a preset touch region, a touch key, a physical key, a mouse or other structures or elements for inputting information in the electronic device, and a specific physical structure of the preset input portion is not limited in the embodiment.

The first display content of the first electronic device is the same as a display content of the second electronic device as a source device.

It should be noted that, the first electronic device has ability for processing data, and performing simply control.

In a specific implementation, upon receiving first display data from the second electronic device, the first electronic device displays the first display content based on the first display data. An operator performs a trigger event based on the first display content, and the first electronic device receives the trigger event.

In step S202, it is judged whether the trigger event is included in a first operation set to obtain a first judgment result.

The first operation set is preset in the first electronic device, which includes at least one operation.

Specifically, it is determined that the trigger event is included in the first operation set, if an operation corresponding to/the same as the trigger event is found in the first operation set; otherwise, it is determined that the trigger event is not included in the first operation set.

It should be noted that, multiple operation sets are preset in the electronic device, and different operation sets include different types of operations. For example, if the trigger event is a first type of operation, the trigger event is included in the first operation set.

As a specific example, an operation in the first operation set is a dual-fingered operation, i.e., an input trajectory is formed by sliding of two fingers side by side. In a specific implementation, other operation sets in the electronic device may include other types of operations, for example a single-fingered operation, i.e., an input trajectory is formed by sliding of one finger.

Practically, it should be noted that, operations included in respective operation sets in the first electronic device are not limited to the single-fingered operation and dual-fingered operation above. In a specific implementation, a user of the first electronic device and the second electronic device may set operation types for different operation sets based on actual cases, which are not limited in the present disclosure.

In step S203, a target information identifier is acquired and target devices are determined based on the trigger event, in the case that the first judgment result indicates that the trigger event is included in the first operation set.

In the case that the trigger event is included in the first operation set, a response mode corresponding to the trigger event is determined based on a response type corresponding to the first operation set.

In the embodiment, the response type corresponding to the first operation set represents performing an interaction of target information between the target devices.

Specifically, operation information included in the trigger event is obtained by analyzing the trigger event, and the target information identifier is acquired and the target devices are determined based on the operation information.

It should be noted that, since the trigger event is performed based on the first display content displayed by the first electronic device and the first display content may include various types of identifiers, for example an application icon and a file icon, the trigger event may be an operation performed on the icon, the target information identifier may be determined as the icon based on the trigger event, and the target devices may be determined based on the operation information included in the trigger event.

In step S204, instruction information is sent to the target devices to instruct the target devices to perform an interaction of target information based on the target information identifier.

The target devices include a target sending device and a target receiving device.

Instruction information is generated when the target devices are determined, and the instruction information is sent to the target devices.

It should be noted that, after the target devices receive the instruction information, the target devices perform an interaction of target information based on the target information identifier, and the interaction mode will be described in detail in the subsequent embodiments, which is not described in the embodiment.

In a specific implementation, in the case that the trigger event is an operation performed on two display contents which are displayed based on display data respectively sent from two source devices, the target sending device is one of the source devices and the target receiving device is the other of the source devices.

Figure 3A:
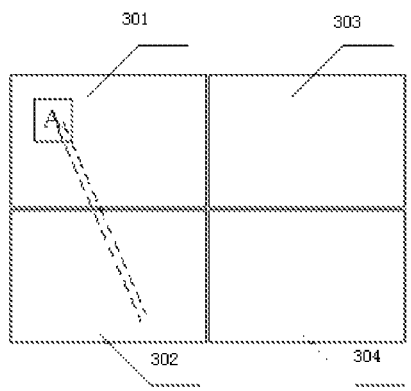
FIGS. 3a and 3b are schematic diagrams of an application scene of the electronic device control method according to the embodiment of the present disclosure illustrated in FIG. 2.
Figure 3B:
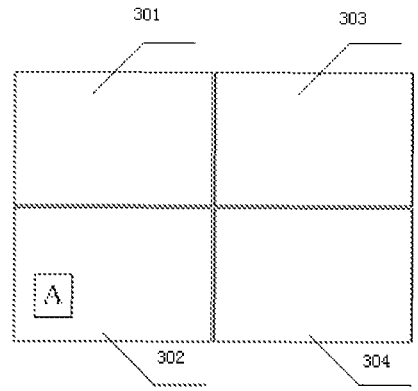

FIG. 3a and FIG. 3b show schematic diagrams of an application scene of the embodiment. There are four source devices, i.e., the first electronic device receives display data from the four source devices and displays four display contents 301 to 304 in a display module, and each of the display contents corresponds to one source device.

FIG. 3a shows an input operation of an operator. The operator performs a sliding operation on the display content, and the sliding operation is a dual-fingered operation which is indicated by two parallel dotted lines. The sliding operation is performed on a display content 301 and a display content 302, and the sliding operation starts from an icon A in the display content 301 and ends at a certain position in the display content 302.

FIG. 3b shows a display content in a display module of the first electronic device after the first electronic device performs the control method. Icon A is moved into the display content 302, and information corresponding to the icon A is moved into a source device corresponding to the display content 302.

It should be noted that, in the application scene, the target information in one source device is moved into another source device. In a specific implementation, the information may be processed according to the control method in other ways, for example copying the information, and the way for processing the information is not limited in the embodiment.

According to the embodiment, it is provided an electronic device control method, which is applied to the first electronic device. The method includes: a trigger event is received based on a first display content displayed by the first electronic device; it is judged whether the trigger event is included in a first operation set to obtain a first judgment result; a target information identifier is acquired and target devices are determined based on the trigger event, in the case that the first judgment result indicates that the trigger event is included in the first operation set; instruction information is sent to the target devices to instruct the target devices to perform an interaction of target information based on the target information identifier, where the target devices include a target sending device and a target receiving device. With the method, interaction of target information between the target devices can be performed quickly based on the content displayed in the first electronic device functioning as a mirror device, thereby improving experience of a user.

Figure 4:
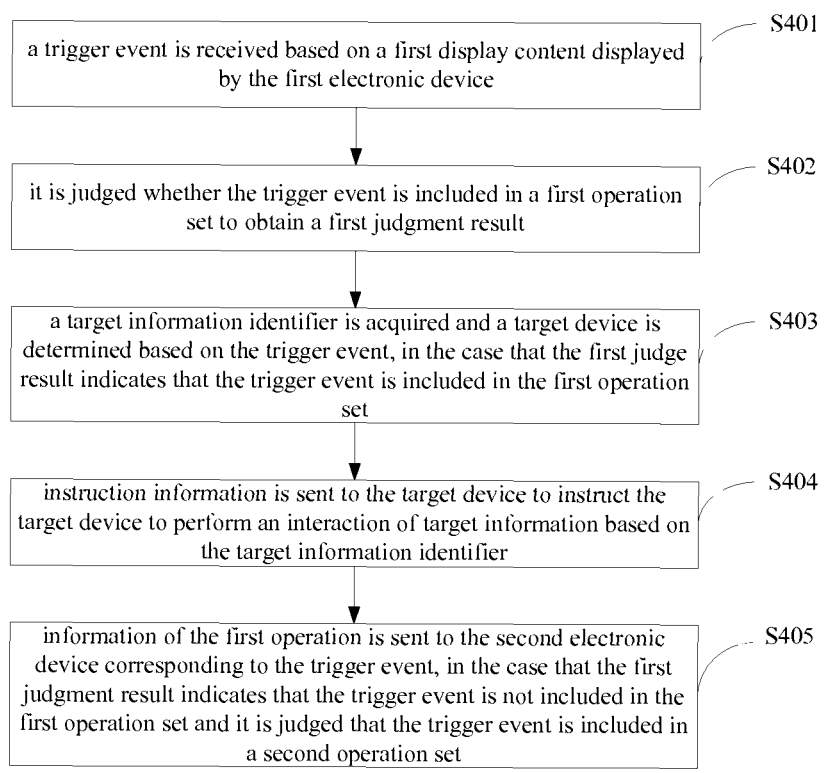
FIG. 4 is a flowchart of an electronic device control method according to an embodiment of the present disclosure.

Reference is made to FIG. 4, which shows a flowchart of an electronic device control method according to an embodiment of the present disclosure. The method includes step S401 to step S405 hereinafter.

In step S401, a trigger event is received based on a first display content displayed by the first electronic device.

In step S402, it is judged whether the trigger event is included in a first operation set to obtain a first judgment result.

In the case that the first judgment result indicates the trigger event is included in a first operation set, step S403 is performed; and in the case that the first judgment result indicates that the trigger event is not included in the first operation set, step S405 is performed.

In step S403, a target information identifier is acquired and a target device is determined based on the trigger event, in the case that the first judge result indicates that the trigger event is included in the first operation set.

In step S404, instruction information is sent to the target device to instruct the target device to perform an interaction of target information based on the target information identifier.

Step 401 to step 404 are the same as step S201 to step S204 in the embodiment as shown in FIG. 2, which are not described in the embodiment.

In step S405, information of the first operation is sent to the second electronic device corresponding to the trigger event, in the case that the first judgment result indicates that the trigger event is not included in the first operation set and it is judged that the trigger event is included in a second operation set.

In the case that the first judgment result indicates that the trigger event is not included in the first operation set, it is further judged whether the trigger event is included in other operation sets. In the case that the trigger event is included in the second operation set, it responds to the trigger event based on a response mode of the second operation set.

In a specific implementation, in the case that the trigger event is included in the second operation set and the trigger event is an operation performed on a display content which is displayed based on display data sent from a source device, the target device is the source device.

It should be noted that, upon receiving the information of the trigger event, the second electronic device processes the information of the trigger event based on the display content of the second electronic device.

In a specific implementation, the second electronic device sending display data to the first electronic device functions as a source device; and the first electronic device sends the information of the first operation to the second electronic device corresponding to the trigger event, thereby controlling the source device.

Figure 5A:
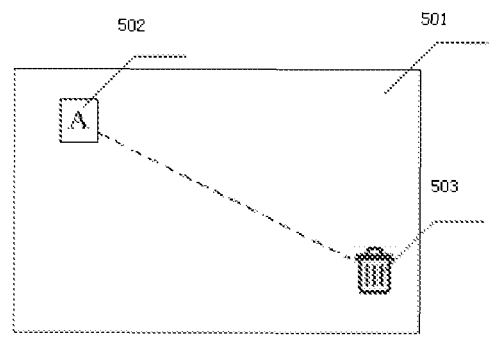
FIGS. 5a and 5b are schematic diagrams of an application scene of the electronic device control method according to the embodiment of the present disclosure illustrated in FIG. 4.
Figure 5B:
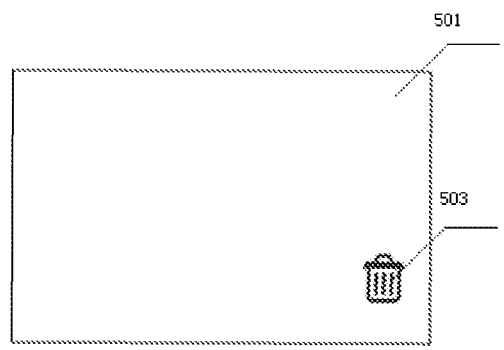

FIG. 5a and FIG. 5b show a schematic diagram of an application scene according to an embodiment of the present disclosure. In the scene, there is one source device, i.e., the first electronic device receives display data from the source device and displays one display content 501 in a display module. FIG. 5a shows an input operation of an operator in the scene. The operator performs a sliding operation on the display content; the sliding operation is a single-fingered operation which is indicated by a dotted line in the FIG. 5a, and the sliding operation starts from icon A 502 and ends at a recycle bin icon 503 in the display content 501. FIG. 5b shows a display content in the display module of the first electronic device after the first electronic device performs the control method in the scene. The icon A is deleted from the source device under the control of the first electronic device.

Figure 6A:
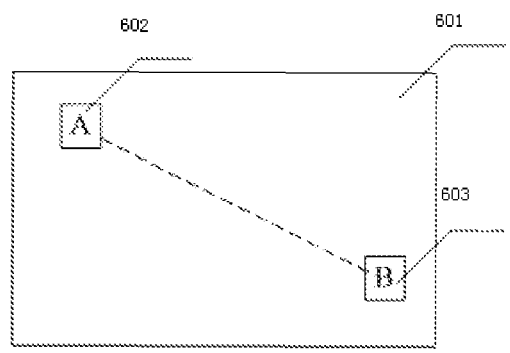
FIGS. 6a and 6b are schematic diagrams of another application scene of an electronic device control method according to the embodiment of the present disclosure illustrated in FIG. 4.
Figure 6B:
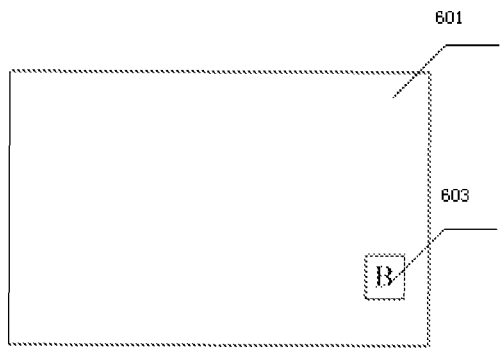

FIG. 6a and FIG. 6b shows a schematic diagram of another application scene according to an embodiment of the present disclosure. In the scene, there is one source device, i.e., the first electronic device receives display data from the source device and displays one display content 601 in a display module, and an icon 602 of the first electronic device is also displayed in the display module. FIG. 6a shows an input operation of an operator in the scene. The operator performs a sliding operation on the display content; the sliding operation is a single-fingered operation which is indicated by a dotted line in the FIG. 6a, and the sliding operation starts from an icon A 602 and ends at an icon B 603 in the display content 601. FIG. 6b shows a display content in the display module of the first electronic device after the first electronic device performs the control method in the scene. The icon A 602, as a next-level icon of the icon B 603, in the display content 601 disappears, and the first electronic device controls to move information associated with the icon A in the source device into the first electronic device.

In case of multiple source devices, a control may be performed on any of the source devices, and for a control mode, one may refer to the scenes shown in FIGS. 5a, 5b and FIGS. 6a and 6b.

According to the embodiment, it is provided an electronic device control method which includes: information of a trigger event to a second electronic device corresponding to the trigger event, in the case that a first judgment result indicates that the trigger event is not included in a first operation set and it is judged that the trigger event is included in a second operation set. With the method, the information of the trigger event is directly sent to the source device, the source device responds to the trigger event, it is achieved that the mirror device controls the source device.

Figure 7:
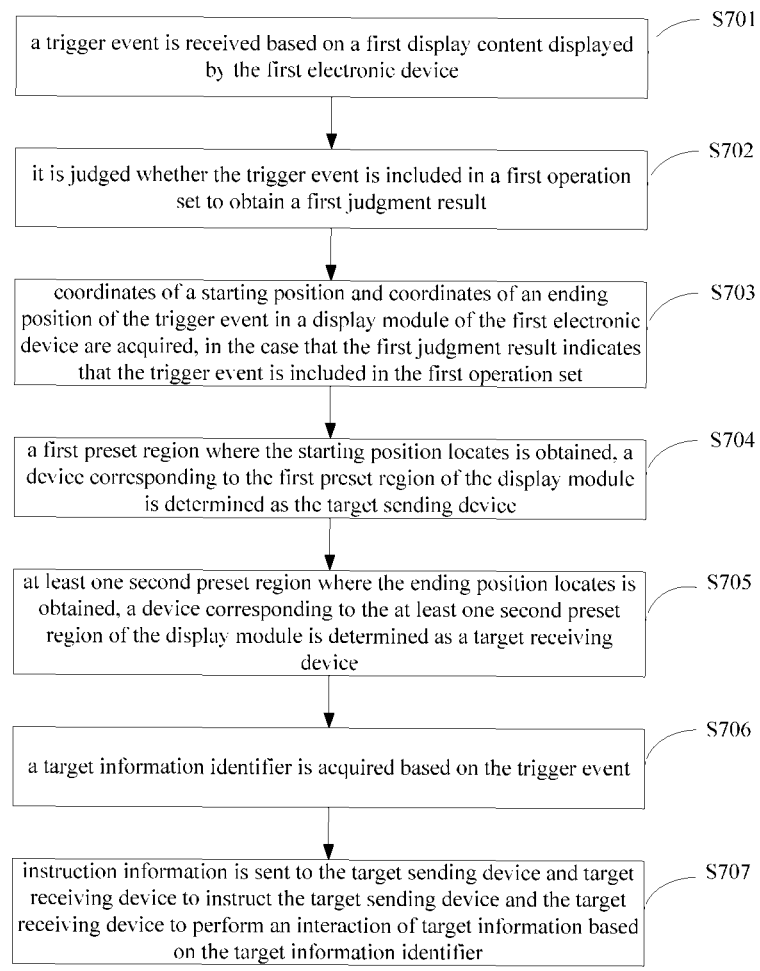
FIG. 7 is a flowchart of an electronic device control method according to an embodiment of the present disclosure.

Reference is made to FIG. 7, which shows a flowchart of an electronic device control method according to an embodiment of the present disclosure. The method includes step S701 to step S707 hereinafter.

In step S701, a trigger event is received based on a first display content displayed by the first electronic device.

In step S702, it is judged whether the trigger event is included in a first operation set to obtain a first judgment result.

Step S701 to step S702 are the same as step S201 to step S202 in the embodiment as shown in FIG. 2, which are not described in the embodiment.

In step S703, coordinates of a starting position and coordinates of an ending position of the trigger event in a display module of the first electronic device are acquired, in the case that the first judgment result indicates that the trigger event is included in the first operation set.

The trigger event corresponds to a trajectory in the display module of the first electronic device, and the trajectory may be generated in the first electronic device via a touch display module or other input devices, for example a mouse.

Specifically, a coordinate system is created based on a size of the display module of the first electronic device; the trajectory corresponding to the trigger event is placed in the coordinate system, and the coordinates of the starting position and the coordinates of the ending position of the trigger event in the display module of the first electronic device are determined based on the coordinate system.

In step 704, a first preset region where the starting position locates is obtained, a device corresponding to the first preset region of the display module is determined as the target sending device.

The first preset region where the starting position locates is obtained by analyzing the coordinates of the starting position, and the first preset region corresponds to an electronic device, which may be a first electronic device or a second electronic device, the electronic device corresponding to the first preset region is determined as the target sending device.

In step S705, at least one second preset region where the ending position locates is obtained, a device corresponding to the at least one second preset region of the display module is determined as a target receiving device.

Specifically, the second preset region where the ending position locates is obtained by analyzing the coordinates of the ending position, and the second preset region correspond to an electronic device, which may be a first electronic device or a second electronic device, the electronic device corresponding to the second preset region is determined as the target receiving device.

It should be noted that, in a specific implementation, since the trigger event may be a dual-fingered operation, a corresponding operation area is large and may cover two display contents; and in the case that the ending position is within a region which include two display contents, two source devices respectively corresponding to the two display contents are determined as the target receiving devices.

Figure 8A:
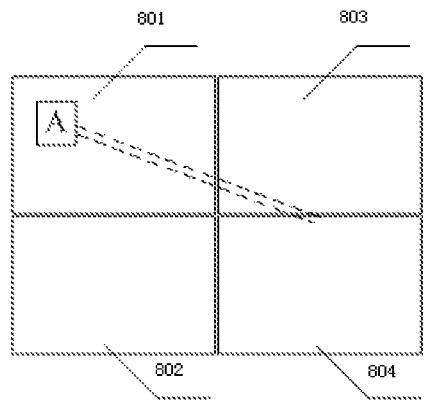
FIGS. 8a and 8b are schematic diagrams of an application scene of the electronic device control method according to the embodiment of the present disclosure illustrated in FIG. 7.
Figure 8B:
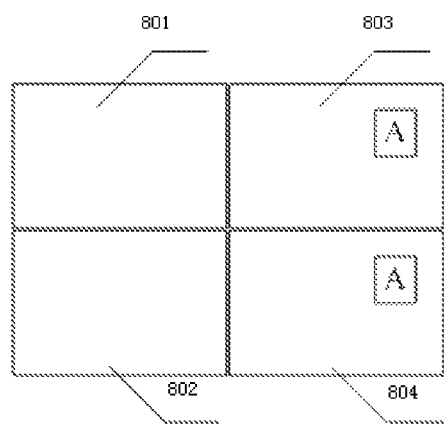

FIGS. 8a and 8b shows a schematic diagram of an application scene according to an embodiment of the present disclosure. In the scene, there are four source devices, i.e., the first electronic device receives display data from the four source devices and displays four display contents 801 to 804 in a display module, and each of the display contents corresponds to one source device. FIG. 8a shows an input operation of an operator in the scene. The operator performs a sliding operation on the display content; the sliding operation is a dual-fingered operation which is indicated by two parallel dotted lines; the sliding operation is performed on a display content 801, a display content 803 and a display content 804, and the sliding operation starts from an icon A in the display content 801 and ends at a position where the display content 803 is adjacent to the display content 804. FIG. 8b shows a display content in the display module of the first electronic device after the first electronic device performs the control method in the scene, the icon A in the display content 801 is moved into the display content 803 and the display content 804, and information corresponding to the icon A is moved to source devices corresponding to the display content 803 and the display content 804.

In step S706, a target information identifier is acquired based on the trigger event.

In step S707, instruction information is sent to the target sending device and target receiving device to instruct the target sending device and the target receiving device to perform an interaction of target information based on the target information identifier.

Step S707 is the same as step S204 in the embodiment as shown in FIG. 2, which is not described in the embodiment.

It should be noted that, step S706 may be performed when steps S703 to S705 are performed, step S706 may be performed after steps S703 to S605 are performed, or step S706 may be performed before steps S703 to S705 are performed.

According to the embodiment, it is provided an electronic device control method. In the method, coordinates of a starting position and coordinates of an ending position of the trigger event in a display module of the first electronic device are acquired; a first preset region where the starting position locates is obtained, a device corresponding to a first preset region of the display module as the target sending device; and at least one second preset region where the ending position locates is obtained, a device corresponding to the at least one second preset region of the display module as the target receiving device. With the method, by analyzing a relation between the starting position and the ending position of the first operation in the display module of the first electronic device and the region corresponding to the first electronic device or the second electronic device, the target sending device and the target receiving device are determined by calculating data simply.

Figure 9:
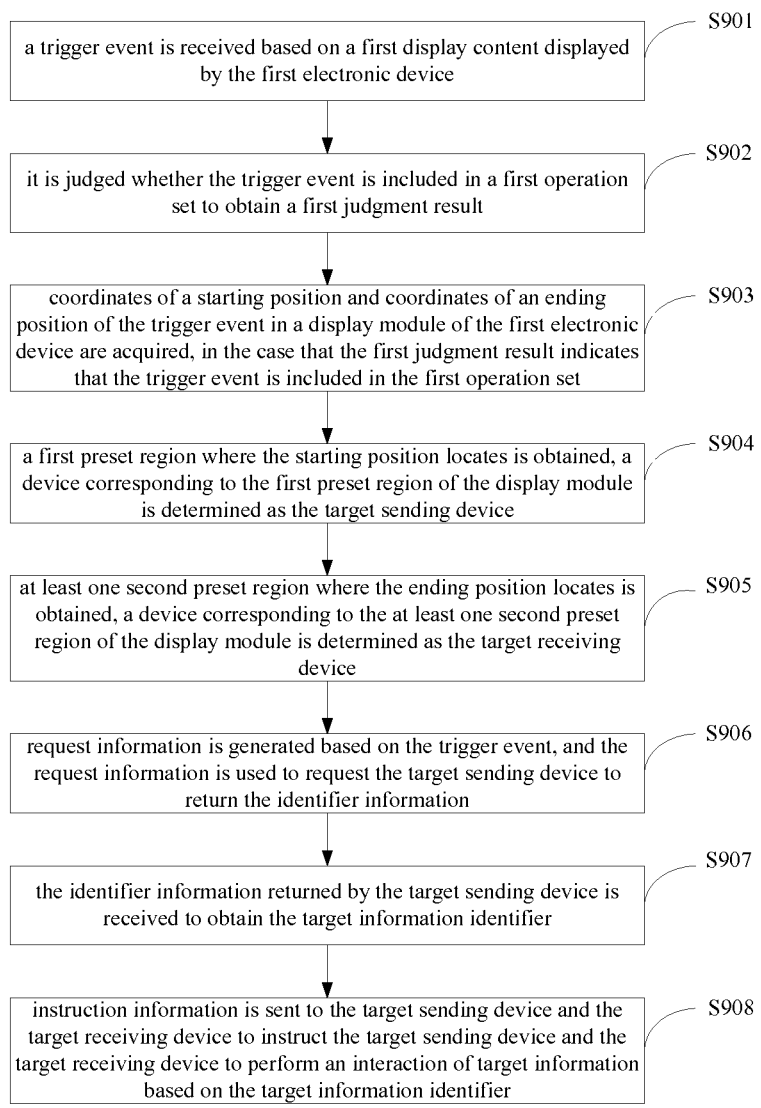
FIG. 9 is a flowchart of an electronic device control method according to an embodiment of the present disclosure.

FIG. 9 shows a flowchart of an electronic device control method according to an embodiment of the present disclosure. The method includes step S901 to step S908 hereinafter.

In step S901, a trigger event is received based on a first display content displayed by the first electronic device.

In step S902, it is judged whether the trigger event is included in a first operation set to obtain a first judgment result.

In step S903, coordinates of a starting position and coordinates of an ending position of the trigger event in a display module of the first electronic device are acquired, in the case that the first judgment result indicates that the trigger event is included in the first operation set.

In step S904, a first preset region where the starting position locates is obtained, a device corresponding to the first preset region of the display module is determined as the target sending device.

In step S905, at least one second preset region where the ending position locates is obtained, a device corresponding to the at least one second preset region of the display module is determined as the target receiving device.

Step S901 to step S905 are the same as step S701 to step S705 in the embodiment as shown in FIG. 7, which are not described in the embodiment.

In step S906, request information is generated based on the trigger event, and the request information is used to request the target sending device to return the identifier information.

The coordinates of the starting position of the trigger event in the display module of the first electronic device are determined by analyzing the first operation.

Request information, in which the coordinates of the starting position are carried, is generated based on the trigger event, and the request information is sent to the target sending device to request the target sending device to return the identifier information.

It should be noted that, in the display module of the first electronic device, a region corresponding to the target information identifier corresponds to the starting position; accordingly, based on the coordinates of the starting position and in conjunction with a ratio between the display module of the first electronic device and the display module of the second electronic device, the second electronic device determines a content displayed at a position in the second electronic device corresponding to the starting position in the display module of the first electronic device, for example the target information identifier.

In step S907, the identifier information returned by the target sending device is received to obtain the target information identifier.

Upon receiving the request information, the target sending device determines the identifier information based on the request information, and returns the identifier information to the first electronic device, such that the first electronic device obtains the target information identifier.

In a specific implementation, the identification information returned from the target sending device to the first electronic device carries link information of the identifier, for example a storage address (such as a url address) or a link.

It should be noted that, in a specific implementation, based on the coordinates of the starting position, the second electronic device can determine the starting position in the display module of the first electronic device based on the ratio between the display module of the first electronic device and the display module of the second electronic device. In the case that an icon identifier is not found at a position in the second electronic device corresponding to the starting position, the second electronic device may return prompt information to the first electronic device, to make the first electronic device sends operation information of the first operation to the second electronic device, such that the second electronic device may perform judging based on the information of the first operation.

In step S908, instruction information is sent to the target sending device and the target receiving device to instruct the target sending device and the target receiving device to perform an interaction of target information based on the target information identifier.

Step S908 is the same as step S707 in the embodiment as shown in FIG. 7, which is not described in the embodiment.

It should be noted that, steps S906 and S907 may be performed when steps S903 to S905 are performed, step S906 and S907 may be performed after steps S903 to S905 are performed, or step S906 and S907 may be performed before steps S903 to S905 are performed.

According to the embodiment, it is provided an electronic device control method. in the method, request information is generated based on the trigger event, where the request information is used to request the target sending device to return identifier information; and the identifier information returned by the target sending device is received to obtain the target information identifier. With the method, the target information identifier is determined simply by simple information interaction with the target sending device.

Figure 10:
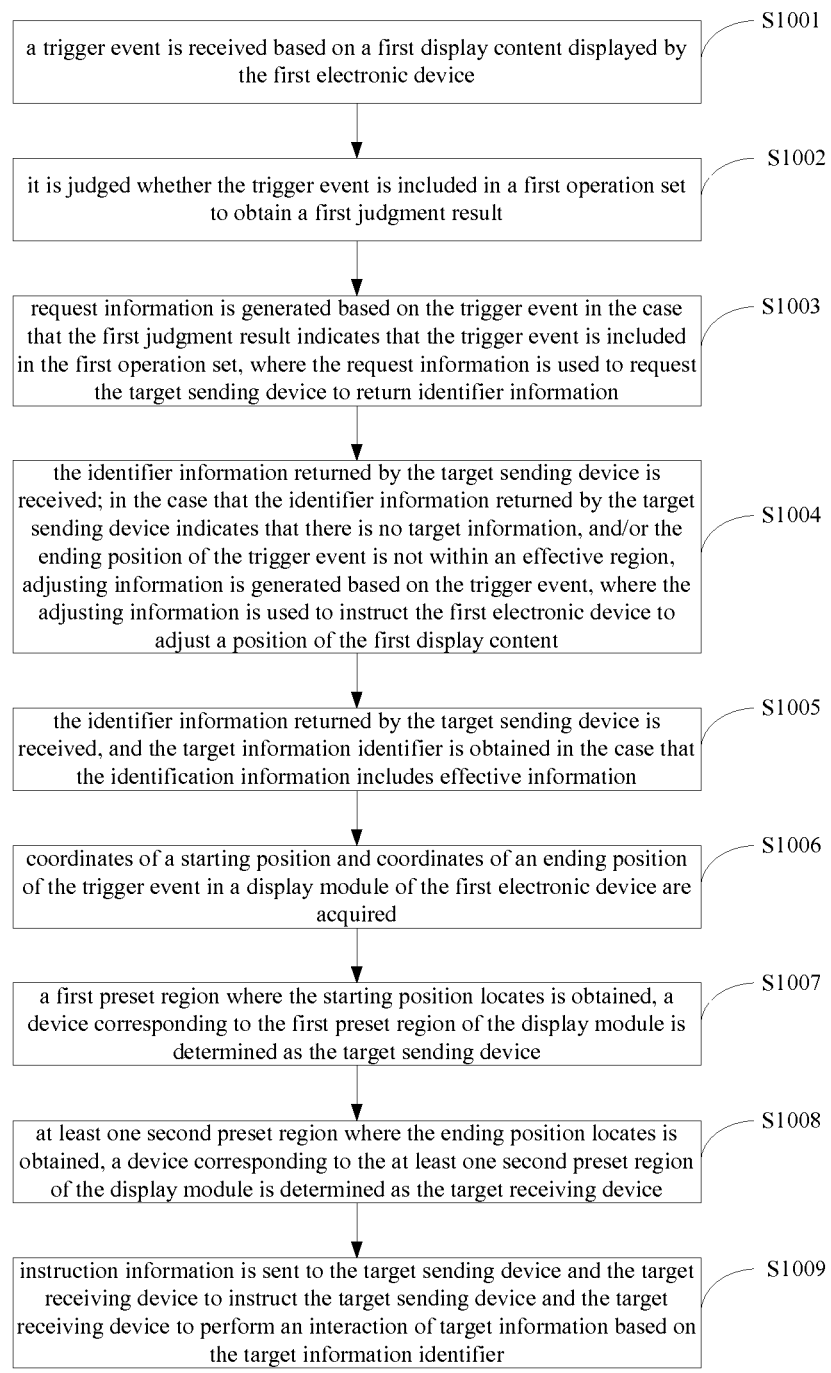
FIG. 10 is a flowchart of an electronic device control method according to an embodiment of the present disclosure.

Reference is made to FIG. 10, which shows an electronic device control method according to an embodiment of the present disclosure. The method includes step S1001 to step S1009 hereinafter.

In step S1001, a trigger event is received based on a first display content displayed by the first electronic device.

In step S1002, it is judged whether the trigger event is included in a first operation set to obtain a first judgment result.

In step S1003, request information is generated based on the trigger event in the case that the first judgment result indicates that the trigger event is included in the first operation set, where the request information is used to request the target sending device to return identifier information.

Step S1001 to S1003 are the same as step S901 to step S903 in the embodiment as shown in FIG. 9, which are not described in the embodiment.

The identifier information returned by the target sending device is received, and it is judged whether the identifier information includes effective information. In the case that there is no effective information in the identification information, step S1004 is performed; and in the case that there is effective information in the identifier information, step S1005 is performed.

In step S1004, the identifier information returned by the target sending device is received; in the case that the identifier information returned by the target sending device indicates that there is no target information, and/or the ending position of the trigger event is not within an effective region, adjusting information is generated based on the trigger event, where the adjusting information is used to instruct the first electronic device to adjust a position of the first display content.

In the case that the identifier information returned by the target sending device indicates that there is no target information at a position corresponding to the starting position of the trigger event, the position may be determined as a blank region in the display content.

In the case that the ending position of the trigger event is not within an effective region, that is, the ending position of the trigger event is within an ineffective display region, a position corresponding to the ending position of the trigger event may be determined as a blank region in the display module.

Specifically, in the case that the identifier information returned by the target sending device indicates that there is no target information and/or the ending position of the trigger event is not within the effective region, a first display content displayed at the starting position of the trigger event is moved from the starting position to the ending position based on the trigger event, thereby adjusting a display position of the display content in the first display module.

Figure 11A:
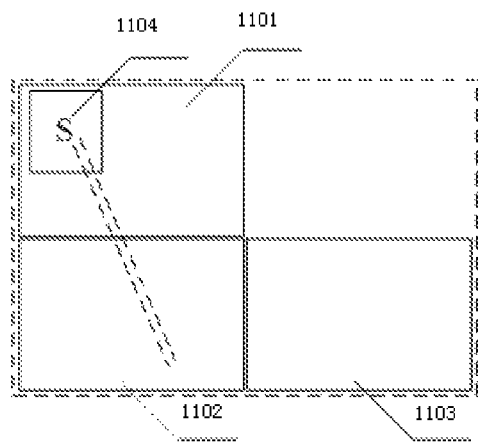
FIGS. 11a and 11b are schematic diagrams of an application scene of the electronic device control method according to the embodiment of the present disclosure illustrated in FIG. 8.
Figure 11B:
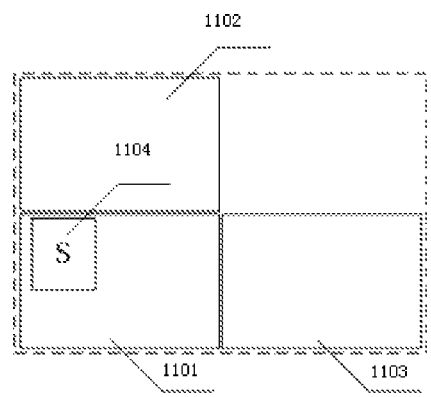

FIG. 11a and FIG. 11b show schematic diagrams of an application scene of the embodiment. In the scene, there are three source devices, i.e., the first electronic device receives display data from the three source devices and displays three display contents 1101 to 1103 in a display module, and each of the display contents corresponds to one source device.

FIG. 11a shows an input operation of an operator in the scene. The operator performs a sliding operation on the display content, the sliding operation is a dual-fingered operation which is indicated by two parallel dotted lines in the FIG. 11a; the sliding operation is performed on a display content 1101 and a display content 1102 and starts from an region S1104 in the display content 1101 and ends at a certain position in the display content 1102. There is no display icon in the S region 1104.

FIG. 11b shows a display content in the display module of the first electronic device after the first electronic device performs the control method in the scene. The display content 1101 is moved from a first region to a second region and the display content 1102 is moved from the second region to the first region, thereby exchanging the display region for the display content 1101 with the display region for the display content 1102.

Figure 12A:
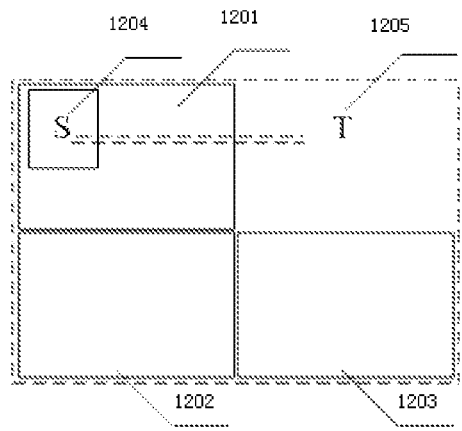
FIGS. 12a and 12b are schematic diagrams of another application scene of the electronic device control method according to the embodiment of the present disclosure illustrated in FIG. 10.
Figure 12B:
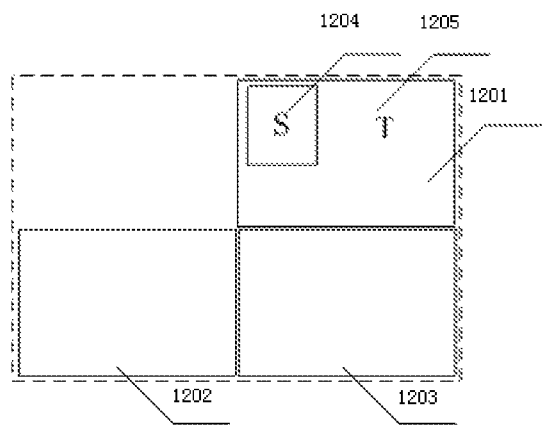

FIG. 12a and FIG. 12b show schematic diagrams of an application scene of the embodiment. In the scene, there are three source devices, i.e., the first electronic device receives display data from the three source devices and displays three display contents 1201 to 1203 in a display module, and each of the display contents corresponds to one source device.

FIG. 12a shows an input operation of an operator in the scene. The operator performs a sliding operation on the display content, the sliding operation is a dual-fingered operation which is indicated by two parallel dotted lines; the sliding operation is performed on a display content 1201 and a display content 1205 and starts from an region S 1204 and ends at a region T 1205 in the display content 1201. There is no display content in the region T 1205.

FIG. 12*b* shows a display content of the display module of the first electronic device after the first electronic device performs the control method in the scene. The display content 1201 is moved from a first region to a second region including the region T 1205, thereby changing the display region for the display content 1201.

In step S1005, the identifier information returned by the target sending device is received, and the target information identifier is obtained in the case that the identification information includes effective information.

In step S1006, coordinates of a starting position and coordinates of an ending position of the trigger event in a display module of the first electronic device are acquired.

In step S1007, a first preset region where the starting position locates is obtained, a device corresponding to the first preset region of the display module is determined as the target sending device.

In step S1008, at least one second preset region where the ending position locates is obtained, a device corresponding to the at least one second preset region of the display module is determined as the target receiving device.

In step S1009, instruction information is sent to the target sending device and the target receiving device to instruct the target sending device and the target receiving device to perform an interaction of target information based on the target information identifier.

Step S1005 to step S1009 are the same as step S904 to step S908 in the embodiment as shown in FIG. 9, which are not described in the embodiment.

According to the embodiment, it is provided an electronic device control method. In the method, adjusting information is generated based on the trigger event in the case that the identifier information returned by the target sending device indicates that there is no target information and/or the ending position of the trigger event is not within an effective region, where the adjusting information is used to instruct the first electronic device to adjust a position of the first display content. With the method, operation modes for the first operation set is increased, flexibility of operation and control and increased accordingly, and experience of the user is improved.

The identifier information returned by the target sending device includes link information of target information.

Figure 13:
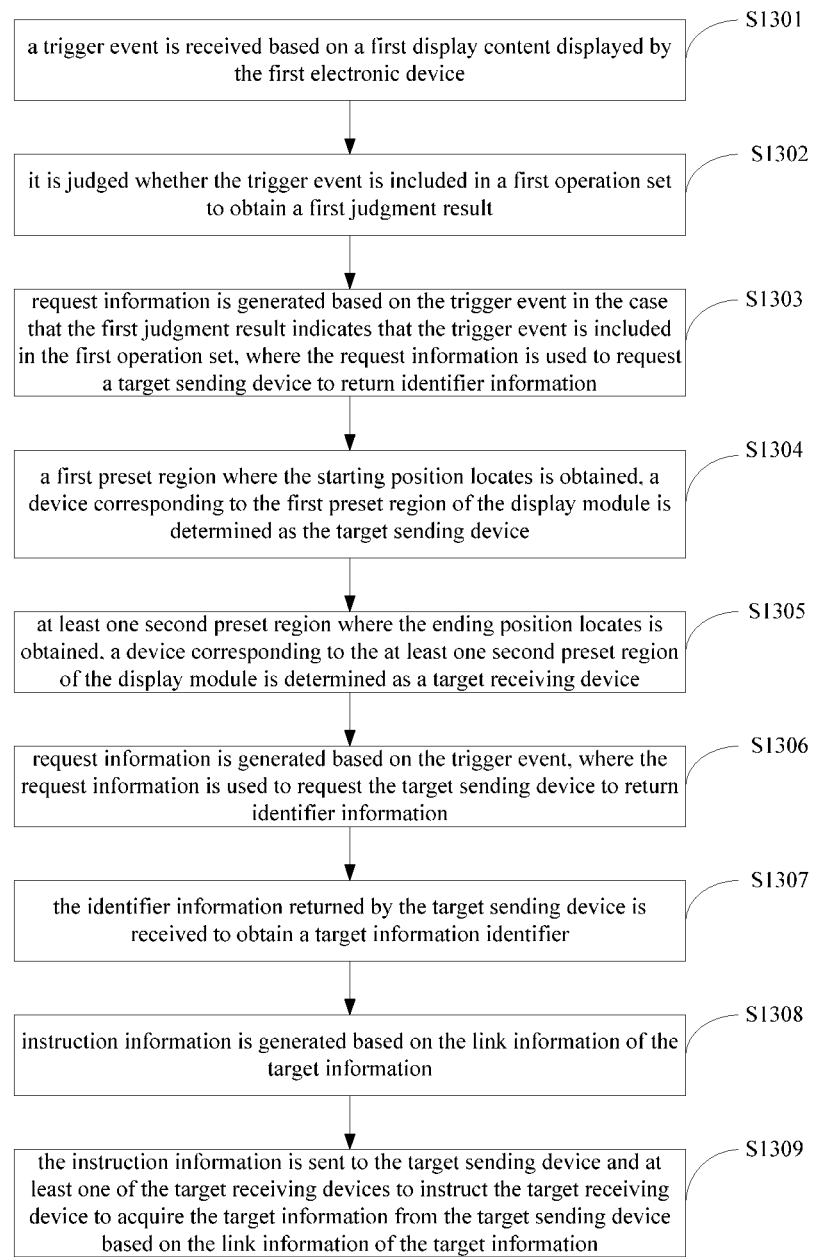
FIG. 13 is a flowchart of an electronic device control method according to an embodiment of the present disclosure.

Reference is made to FIG. 13, which shows a flowchart of an electronic device control method according to an embodiment of the present disclosure. The method includes step S1301 to step S1309 hereinafter.

In step S1301, a trigger event is received based on a first display content displayed by the first electronic device.

In step S1302, it is judged whether the trigger event is included in a first operation set to obtain a first judgment result.

In step S1303, request information is generated based on the trigger event in the case that the first judgment result indicates that the trigger event is included in the first operation set, where the request information is used to request a target sending device to return identifier information.

In step S1304, a first preset region where the starting position locates is obtained, a device corresponding to the first preset region of the display module is determined as the target sending device.

In step S1305, at least one second preset region where the ending position locates is obtained, a device corresponding to the at least one second preset region of the display module is determined as a target receiving device.

In step S1306, request information is generated based on the trigger event, where the request information is used to request the target sending device to return identifier information.

In step S1307, the identifier information returned by the target sending device is received to obtain a target information identifier.

Step S1301 to S1307 are the same as step S901 to S907 in the embodiment as shown in FIG. 9, which are not described in the embodiment.

In step S1308, instruction information is generated based on the link information of the target information.

The identifier information returned by the target sending device carries the link information of the target information.

Instruction information is generated based on the link information, and the instruction information carries the link information of the target information.

In a specific implementation, the link information of the target information may be a storage address or a link, which is not limited in the embodiment.

In step S1309, the instruction information is sent to the target sending device and at least one of the target receiving devices to instruct the target receiving device to acquire the target information from the target sending device based on the link information of the target information.

The link of the target information may point to a storage of the target sending device.

Specifically, the process of instructing the target receiving device to acquire the target information from the target sending device based on the link information of the target information may include: acquiring the target information based on the link information of the target information; and forwarding the target information to the target receiving device.

It should be noted that, the instruction information is sent to the target sending device to notify the target sending device to send the target information; and the instruction information is sent to the at least one target receiving device to notify the at least one target receiving device to receive the target information.

It should be noted that, in the embodiment, the target information is forwarded to the target receiving device by the first electronic device. In a specific implementation, in the case that a data transmission channel is provided between source devices, the first electronic device may send the identifier information carrying the link information of the target information to the target receiving device after receiving the identifier information returned by the target sending device, to make the target receiving device directly receives the target information from the target sending device based on the link information of the target information.

According to the embodiment, it is provided an electronic device control method. In the method, instruction information is generated based on the link information of the target information; the instruction information is sent to the target sending device and at least one of the target receiving devices to instruct the target receiving device to acquire the target information from the target sending device based on the link information of the target information. With the method, the target information can be sent from the target sending device to the target receiving device simply based on the link information of the target information.

Figure 14:
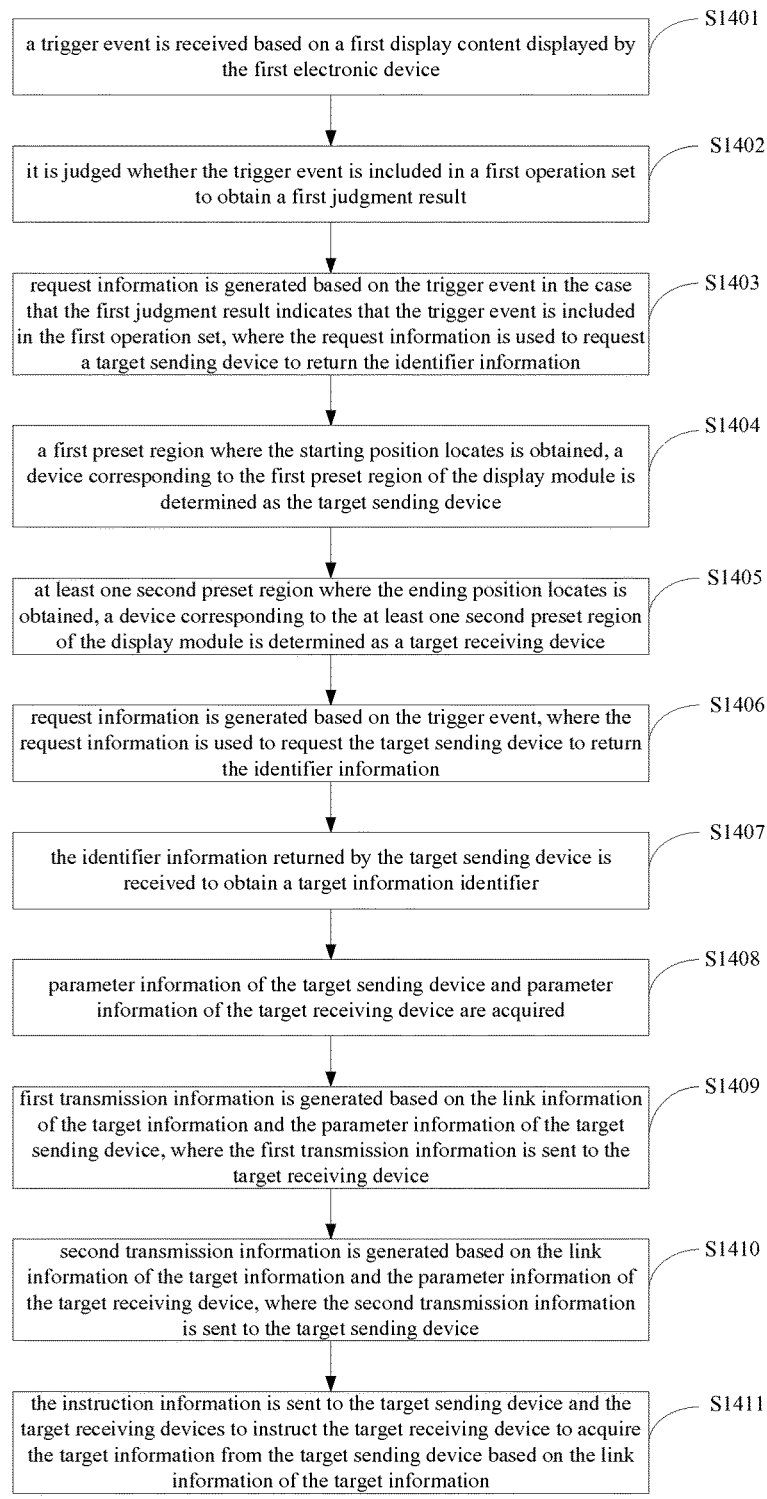
FIG. 14 is a flowchart of an electronic device control method according to an embodiment of the present disclosure.

Reference is made to FIG. 14, which shows an electronic device control method according to an embodiment of the present disclosure. The method includes step S1401 to step S1411 hereinafter.

In step S1401, a trigger event is received based on a first display content displayed by the first electronic device.

In step S1402, it is judged whether the trigger event is included in a first operation set to obtain a first judgment result.

In step S1403, request information is generated based on the trigger event in the case that the first judgment result indicates that the trigger event is included in the first operation set, where the request information is used to request a target sending device to return the identifier information.

In step S1404, a first preset region where the starting position locates is obtained, a device corresponding to the first preset region of the display module is determined as the target sending device.

In step S1405, at least one second preset region where the ending position locates is obtained, a device corresponding to the at least one second preset region of the display module is determined as a target receiving device.

In step S1406, request information is generated based on the trigger event, where the request information is used to request the target sending device to return the identifier information.

In step S1407, the identifier information returned by the target sending device is received to obtain a target information identifier.

Step S1401 to step S1407 are the same as step S1301 to step S1307 in the embodiment as shown in FIG. 13, which are not described in the embodiment.

In step S1408, parameter information of the target sending device and parameter information of the target receiving device are acquired.

In step S1409, first transmission information is generated based on the link information of the target information and the parameter information of the target sending device, where the first transmission information is sent to the target receiving device.

In step S1410, second transmission information is generated based on the link information of the target information and the parameter information of the target receiving device, where the second transmission information is sent to the target sending device.

The first transmission information and the second transmission information are used to instruct the target receiving device to establish a connection with the target sending device using the parameter information and acquire the target information using the link information of the target information.

Upon the target sending device is determined, the parameter information of the target sending device is acquired; and the first transmission information is generated based on the parameter information and the link information of the target information.

Upon the target receiving device is determined, the parameter information of the target receiving device is acquired; and the second transmission information is generated based on the parameter information and the link information of the target information.

The first transmission information carrying the parameter information of the target sending device and the link information of the target information is sent to the target receiving device, and the second transmission information carrying the parameter information of the target receiving device and the link information of the target information is sent to the target sending device, a connection is established between the target receiving device and the target sending device based on the first transmission information and the second transmission information and a data transmission channel is established between the target receiving device and the target sending device.

Specifically, after the data transmission channel is established between the target receiving device and the target sending device, the target receiving device may acquire the target information from the target sending device based on the link information of the target information, thereby performing an interaction of target information between the target receiving device and the target sending device.

In step S1411, the instruction information is sent to the target sending device and the target receiving devices to instruct the target receiving device to acquire the target information from the target sending device based on the link information of the target information.

Step S1411 is the same as step S1309 in the embodiment as shown in FIG. 13, which is not described in the embodiment.

According to the embodiment, it is provided an electronic device control method. In the method, parameter information of the target sending device and parameter information of the target receiving device are acquired; first transmission information is generated based on the link information of the target information and the parameter information of the target sending device, where the first transmission information is sent to the target receiving device; second transmission information is generated based on the link information of the target information and the parameter information of the target receiving device, where the second transmission information is sent to the target sending device. The first transmission information and the second transmission information are used to instruct the target receiving device to establish a connection with the target sending device using the parameter information and acquire the target information using the link information of the target information. With the method, after a data transmission channel between the target receiving device and the target sending device is established, the target receiving device may acquire the target information from the target sending device based on the link information of the target information, thereby performing an interaction of target information between the target receiving device and the target sending device.

Figure 15:
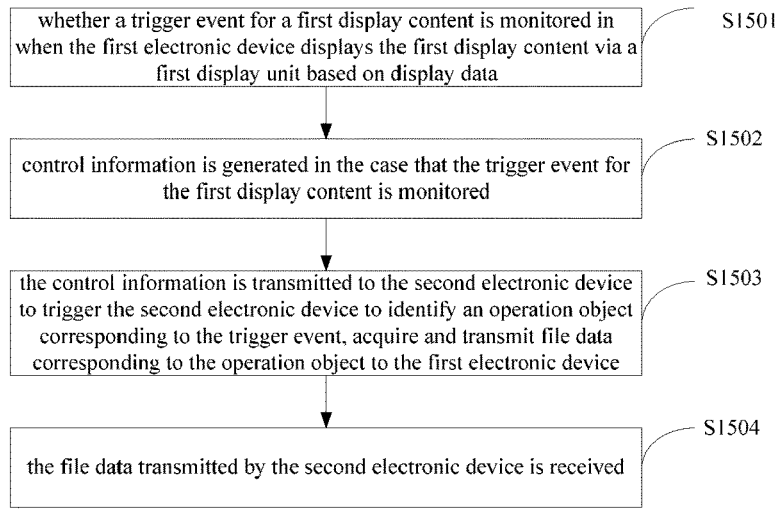
FIG. 15 is a flow chart of an electronic device control method according to an embodiment of the present disclosure.

Referring to FIG. 15, which is a flow chart of an electronic device control method applied to a first electronic device according to an embodiment of the disclosure. The control method includes steps S1501 to S1504.

In step S1501, whether a trigger event for a first display content is monitored in when the first electronic device displays the first display content via a first display unit based on display data.

The display data is transmitted from a second electronic device to the first electronic device and correspond to a second display content in the second electronic device, and the first display content is the same as the second display content.

During operation of the second electronic device, the second electronic device transmits the display data corresponding to the second display content on the second display unit to the first electronic device, and the first electronic device displays the first display content on the first display unit based on the received display data. The first display content displayed on the first display unit of the first electronic device is the same as the second display content on the second display unit of the second electronic device, and thus the mirror display between the first electronic device and the second electronic device is achieved.

Whether the trigger event for the first display content is monitored in a real-time manner in the case that the first electronic device displays the first display content via the first display unit based on display data. The trigger event is a trigger event performed on an object in the first display content.

In step S1502, control information is generated in the case that the trigger event for the first display content is monitored.

The control information includes information about a trigger position of the trigger event in the first display content. In an embodiment, the information about the trigger position may be a relative position of the trigger position of the trigger event in the first display content relative to four vertexes of the first display content, or may be a coordinate position of the trigger position of the trigger event in a coordinate system constructed with an origin of a determined point in the first display content.

In step S1503, the control information is transmitted to the second electronic device to trigger the second electronic device to identify an operation object corresponding to the trigger event, acquire and transmit file data corresponding to the operation object to the first electronic device.

After received the control information, the second electronic device determines the trigger position the trigger event in the first display content. Since the second display content of the second electronic device is the same as the first display content of the first electronic device, the second electronic device can determine a position in the second display content, which corresponds to the trigger position of the trigger event in the first display content, and identify an object at the position. The object is the operation object corresponding to the trigger event in the first electronic device. The second electronic device acquires the file data corresponding to the operation object and transmits the file data to the first electronic device.

In step S1504, the file data transmitted by the second electronic device is received.

In the above-described control method applied to the first electronic device according to the disclosure, in the case that there is a trigger event for the first display content when the first electronic device displays the first display content via the first display unit based on the display data, the control information including the trigger position of the trigger event in the first display content is generated and transmitted to the second electronic device, and the file data transmitted by the second electronic device based on the control information are received, thereby enriching functions of the second electronic device and improving user experience.

After the file data transmitted from the second electronic device are received, the file data may be stored. There are other ways to process the file data.

Figure 16:
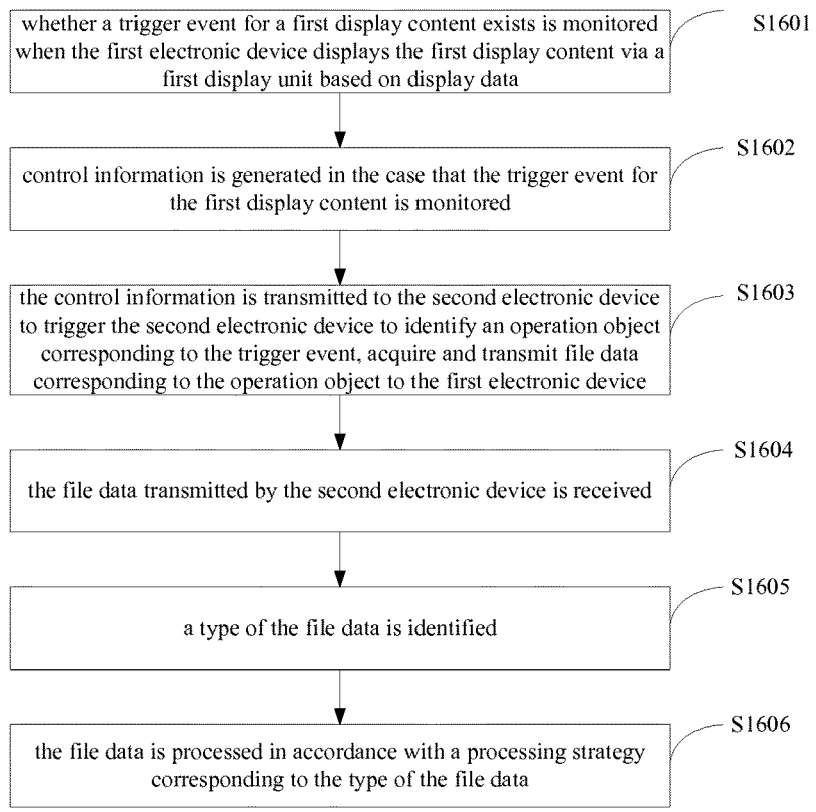
FIG. 16 is a flow chart of an electronic device control method according to an embodiment of the present disclosure.

Referring to FIG. 16, which is a flow chart of an electronic device control method applied to a first electronic device according to an embodiment of the disclosure. The control method includes steps S1601 to S1606.

In step S1601, whether a trigger event for a first display content exists is monitored when the first electronic device displays the first display content via a first display unit based on display data.

In step S1602, control information is generated in the case that the trigger event for the first display content is monitored.

In step S1603, the control information is transmitted to the second electronic device to trigger the second electronic device to identify an operation object corresponding to the trigger event, acquire and transmit file data corresponding to the operation object to the first electronic device.

In step S1604, the file data transmitted by the second electronic device is received.

In step S1605, a type of the file data is identified.

In step S1606, the file data is processed in accordance with a processing strategy corresponding to the type of the file data.

In the control method as shown in FIG. 16, after the file data transmitted from the second electronic device is received, the type of the file data is identified, and the file data is processed in accordance with the processing strategy corresponding to the type of the file data. That is, after received the file data transmitted from the second electronic device, the first electronic device can process the file data automatically without manual operation.

In an embodiment, there is the following way to process the file data in accordance with a processing strategy corresponding to the type of the file data.

It is judged whether the file data is capable of running by itself to obtain a first judgment result; the file data runs in the case that the first judgment result indicates that the file data is capable of running by itself; or an application corresponding to the file data runs and the file data are loaded using the application, in the case that the first judgment result indicates that the file data is not capable of being run by itself.

The disclosure is described in conjunction with examples.

In the case that the user performs a trigger operation on an application icon in the first display content output by the first display unit of the first electronic device, the second electronic device acquires and transmits an application program corresponding to the application icon to the first electronic device based on the received control information. After receiving the application program, the first electronic device determines that the application program is capable of running by itself, and the application program runs.

In the case that the user performs a trigger operation on a file icon in the first display content output by the first display unit of the first electronic device, the second electronic device acquires and transmits a file corresponding to the file icon to the first electronic device based on the received control information. After receiving the file, the first electronic device determines that the file is not capable of running by itself, and an application corresponding to the file runs and the received file is loaded using the application.

In an embodiment, the file icon in the first display content may be an audio file icon, a video file icon or a text file icon, and the first electronic device may receive an audio file, a video file or a text file transmitted from the second electronic device. In the case that an audio file and a video file transmitted from the second electronic device are received by the first electronic device, a predetermined player runs and to play the audio file and video file. In the case that a text file (such as a word file, a PPT file) transmitted from the second electronic device is received by the first electronic device, a corresponding application runs and the text file is loaded into the application.

In the case that the user performs a trigger operation on a network address in the first display content output by the first display unit of the first electronic device, the second electronic device acquires and transmits the network address to the first electronic device based on the control information. After receiving the network address, the first electronic device opens a predetermined browser and loads the network address into an address bar of the browser for search.

In the above-described control methods applied to the first electronic device according to the disclosure, there are many ways to monitor whether there is the trigger event for the first display content, which are described in details as follows.

First, whether a drag operation is performed by an operator in a region where the first display content locates and whether an ending position of the drag operation is located outside the first display content are monitored.

For a user, in the case that the user controls the first electronic device to acquire file data corresponding to an object from the second electronic device, a drag operation is performed in the first display unit of the first electronic device, a starting position of the drag operation is an object in the first display unit, and an ending position of the drag operation is located outside the first display content. In the case that it is detected that the drag operation is performed by the user in the region where the first display content is located and the ending position of the drag operation is located outside the first display content, the first electronic device determines that the there is a trigger event for the first display content. In this case, the information about the trigger position of the trigger event in the first display content includes the starting position and ending position of the drag operation.

Second, whether an operator touches a region where the first display content locates and whether a duration of the touching operation reaches a first duration are monitored.

For a user, in the case that the user controls the first electronic device to acquire file data corresponding to an object from the second electronic device, a position where the object locates in the first display unit is pressed, and the duration of the pressing operation reaches the first duration. In the case that it is detected that the operator touches the region where the first display content locates and the duration of the touching operation reaches the first duration, the first electronic device determines that there is a trigger event for the first display content. In this case, the information about the trigger position of the trigger event in the first display content includes the position of the touching operation.

Third, whether a click operation is performed by an operator in a region where the first display content locates and whether the number of the click operations meets a threshold are monitored.

For a user, in the case that the user controls the first electronic device to acquire file data corresponding to an object from the second electronic device, multiple click operations are performed on the position where the object locates in the first display unit, and the number of the click operations meets the threshold. In the case that it is detected that a predetermined number of the click operations are performed in the region where the first display content locates, the first electronic device determines that there is a trigger event for the first display content. In this case, the information about the trigger position of the trigger event in the first display content includes the position of the click operation.

In the above-described control methods applied to the first electronic device according to the disclosure, the following way may be used to receive the file data transmitted from the second electronic device. The file data transmitted from the second electronic device is received in a first transmission mode, and the first transmission mode is different from a second transmission mode for transmitting the display data.

Different transmission modes are used for different types of data, therefore, the speed and quality of data transmission are improved.

In an embodiment, UDP (User Datagram Protocol) is used in the first transmission mode, and TCP (Transmission Control Protocol) is used in the second transmission mode.

The first electronic device may receive the file data transmitted from the second electronic device via a second data transmission channel. The second data transmission channel is different from a data transmission channel for transmitting the display data. That is, two data transmission channels are established between the first electronic device and the second electronic device, where one data transmission channel is used to transmit the display data and the other data transmission channel is used to transmit the file data. Therefore, the impact on the transmission speed of the display data can be reduced when the second electronic device transmits the file data to the first electronic device.

In addition to the control method applied to the first electronic device according to the disclosure, a control method applied to a second electronic device is further provided according to the disclosure.

Figure 17:
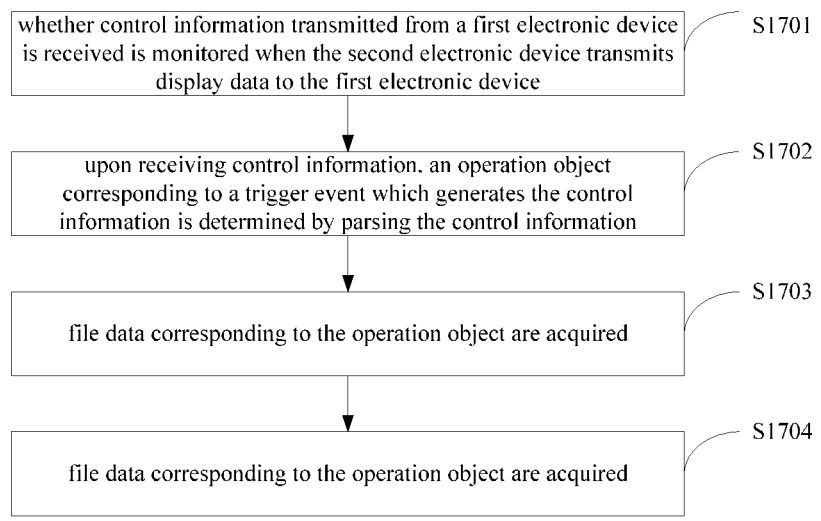
FIG. 17 is a flow chart of an electronic device control method according to an embodiment of the present disclosure.

Referring to FIG. 17, which is a flow chart of an electronic device control method applied to a second electronic device according to an embodiment of the disclosure. The control method includes steps S1701 to S17044.

In step S1701, whether control information transmitted from a first electronic device is received is monitored when the second electronic device transmits display data to the first electronic device.

The display data corresponds to a second display content in the second electronic device, the first electronic device outputs a first display content via a first display unit based on the display data, and the first display content is the same as the second display content.

In step S1702, upon receiving control information, an operation object corresponding to a trigger event which generates the control information is determined by parsing the control information.

When the second electronic device transmits the display data to the first electronic device, the second electronic device monitors whether control information transmitted from the first electronic device is received. Upon receiving the control information transmitted from the first electronic device, the second electronic device parses the control information to acquire the information about the trigger position of the trigger event in the first display content. The second display content of the second electronic device is the same as the first display content of the first electronic device, and the size of the second display content is in a predetermined proportion to the size of the first display content. Therefore, a position in the second display content, which corresponds to the trigger position of the trigger event in the first display content, may be determined. The object at the position is the operation object corresponding to the trigger event.

It should be noted that the operation object corresponding to the trigger event includes, but is not limited to, an application icon, a file icon and an icon of a network address.

In step S1703, file data corresponding to the operation object are acquired.

In step S1704, file data corresponding to the operation object are acquired.

After the operation object corresponding to the trigger event is determined, the file data corresponding to the operation object are acquired and transmitted to the first electronic device.

In the above-described control method applied to the second electronic device according to the disclosure, in the case that the control information transmitted from the first electronic device is received when the second electronic device transmits the display data to the first electronic device, the control information is parsed to determine the operation object corresponding to the trigger event which generates the control information, and the file data corresponding to the operation object is acquired and transmitted to the first electronic device, thereby enriching functions of the first electronic device.

Optionally, the second electronic device may transmits the file data to the first electronic device via a second data transmission channel, and the second data transmission channel is different from a data transmission channel for transmitting the display data. That is, two data transmission channels are established between the first electronic device and the second electronic device, where one data transmission channel is used to transmit the display data and the other data transmission channel is used to transmit the file data. Therefore, the impact on the transmission speed of the display data can be reduced when the second electronic device transmits the file data to the first electronic device.

Whether one data transmission channel is used to transmit data between the second electronic device and the first electronic device, or two data transmission channels are used to transmit data between the second electronic device and the first electronic device, the second electronic device may transmit the file data to the first electronic device in a first transmission mode and transmit the display data to the first electronic device in a second transmission mode. In an embodiment, UDP is used in the first transmission mode, and TCP is used in the second transmission mode.

In practice, in the case that the operation is an application icon, the process of acquiring the file data corresponding to the operation object may include: determining an application indicated by the icon and acquiring the application. in the case that the object is an file icon, the process of acquiring the file data corresponding to the operation object may include: identifying a file name in the icon and acquiring a file named by the file name. the file icon may include an audio file icon, a video file icon or a text file icon. In the case that the operation object is an icon of the network address, the process of acquiring file data corresponding to the operation object may include: acquiring the network address in a current browser.

The electronic device control method is described in detail according to the embodiments of the present disclosure above, which may be implemented using many forms of apparatus. Therefore, an electronic device to which the control method is applied is provided according to the present disclosure, and the electronic device is described in detail in conjunction with specific embodiments hereinafter.

Figure 18:
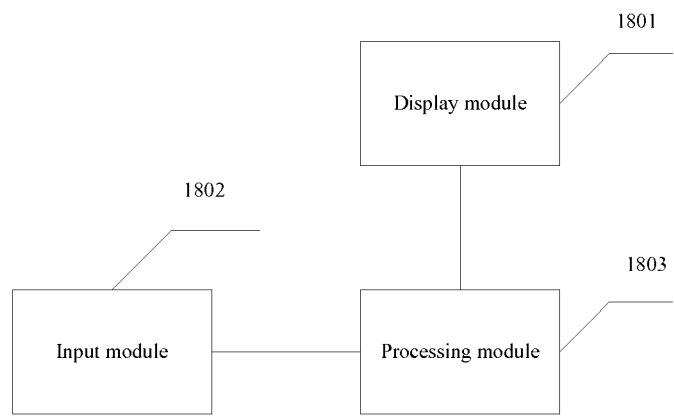
FIG. 18 is a schematic structural diagram of an electronic device according to an embodiment of the present disclosure.

Reference is made to FIG. 18, which is a schematic structural diagram of an electronic device according to an embodiment of the present disclosure. The electronic device may be a first electronic device. The first electronic device is able to receive display data from a second electronic device and perform display based on the display data. The first electronic device may be an electronic device with a large display region, for example a projection device, a desktop computer, a notebook computer, a tablet computer, a mobile phone or a smart television. Accordingly, the second electronic device may be a desktop computer, a notebook computer, a tablet computer, a mobile phone, a smart television, a smart watch or a wearable device.

The electronic device may include: a display module 1801, an input module 1802 and a processing module 1803.

The display module 1801 is configured to display a first display content.

In a specific implementation, the display module may be a display screen of the electronic device.

The input module 1802 is configured to receive a trigger event based on a first display content displayed by the display module. The first electronic device displays the first display content based on display data sent from the second electronic device; a second display content is displayed by the second electronic device based on the display data, and the second display content is the same as the first display content.

In a specific implementation, the input module may be a touch screen of the electronic device and may serve as the display module. The input module may also be a physical key, a mouse or other components or elements for inputting information in the first electronic device, and the specific physical structure of the input module is not limited in the embodiment.

The processing module 1803 is configured to judge whether the trigger event is included in a first operation set to obtain a first judgment result; acquire a target information identifier and determine target devices based on the trigger event, in the case that the first judgment result indicates that the trigger event is included in the first operation set; and send instruction information to the target devices to instruct the target devices to perform an interaction of target information based on the target information identifier, where the target devices include a target sending device and a target receiving device.

In a specific implementation, the processing module may be a structure of the first electronic device capable of processing information, for example a CPU (central processing unit).

According to the embodiment, it is provided an electronic device, which may be the first electronic device. The first electronic device receives the trigger event included in the first operation set based on the content displayed by the first electronic device; acquires the target information identifier and determines the target devices based on the trigger event, an interaction of target information between the target devices is performed based on the target information identifier. Since the first electronic device is a mirror device, the interaction of target information may be performed quickly between different target devices based on the content displayed in the mirror device, thereby improving experience of the user.

Optionally, the processing module may be further configured to send information of the trigger event to the second electronic device corresponding to the trigger event, in the case that the first judgment result indicates that the trigger event is not included in the first operation set and it is judged that the trigger event is included in a second operation set.

Optionally, the processing module is configured to: acquire coordinates of a starting position and coordinates of an ending position of the trigger event in a display module of the first electronic device; obtain a first preset region where the starting position locates, determine a device corresponding to the first preset region of the display module as a target sending device; and obtain at least one second preset region where the ending position locates, determine a device corresponding to the at least one second preset region of the display module as a target receiving device.

Optionally, the processing module is configured to:

acquire coordinates of a starting position and coordinates of an ending position of the trigger event in a display module of the first electronic device;

obtain the first preset region where the starting position locates by analyzing the coordinates of the starting position, determine a device corresponding to the first preset region of the display module as the target sending device; and obtain the at least one second preset region where the ending position locates by analyzing the coordinates of the ending position, determine a device corresponding to the at least one second preset region of the display module as the target receiving device.

Optionally, the processing module is configured to:

generate request information based on the trigger event, where the request information is used to request the target sending device to return identifier information; and receive the identifier information returned by the target sending device to obtain the target information identifier.

Optionally, after the processing module generates the request information based on the trigger event, the processing module may be further configured to:

generate adjusting information based on the trigger event in the case that the identifier information returned by the target sending device indicates that there is no target information and/or the ending position of the first operation is not within an effective region, where the adjusting information is used to instruct the first electronic device to adjust a position of the first display content.

Optionally, the identifier information returned by the target sending device may include link information of the target information, and the processing module is configured to:

generate instruction information based on the link information of the target information; and send the instruction information to the target sending device and the target receiving device to instruct the target receiving device to acquire the target information from the target sending device based on the link information of the target information.

Optionally, the processing module is configured to:

acquire parameter information of the target sending device and parameter information of the target receiving device;

generate first transmission information based on the link information of the target information and the parameter information of the target sending device, where the first transmission information is sent to the target receiving device; and generate second transmission information based on the link information of the target information and the parameter information of the target receiving device, where the second transmission information is sent to the target sending device, where the first transmission information and the second transmission information are used to instruct the target receiving device to establish a connection with the target sending device using the parameter information and acquire the target information using the link information of the target information.

Optionally, the processing module is configured to:

acquire the target information based on the link information of the target information; and forward the target information to the target receiving device.

A control apparatus applied to a first electronic device is further provided according to the disclosure.

Figure 19:
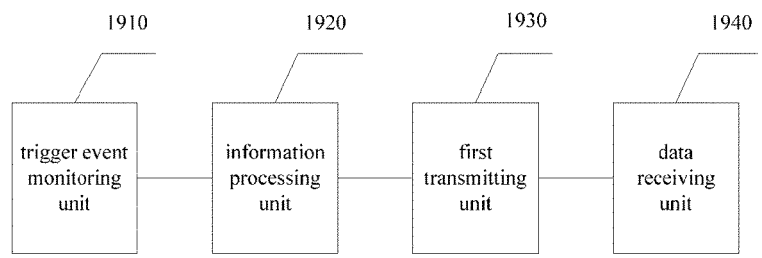
FIG. 19 is a schematic structural diagram of a control apparatus applied to a first electronic device according to an embodiment of the present disclosure.

Referring to FIG. 19, which is a schematic structural diagram of a control apparatus applied to a first electronic device according to an embodiment of the disclosure. The control apparatus includes: a trigger event monitoring unit 1910, an information processing unit 1920, a first transmitting unit 1930 and a data receiving unit 1940.

The trigger event monitoring unit 1910 is configured to monitor whether a trigger event for a first display content when the first electronic device displays the first display content via the first display unit based on display data. The display data is transmitted from a second electronic device to the first electronic device and correspond to a second display content in the second electronic device, and the first display content is the same as the second display content.

The information processing unit 1920 is configured to generate control information in a case that the trigger event for the first display content is monitored, where the control information includes information about a trigger position of the trigger event in the first display content.

The first transmitting unit 1930 is configured to transmit the control information to the second electronic device, to trigger the second electronic device to identify an operation object corresponding to the trigger event, acquire and transmit file data corresponding to the operation object to the first electronic device.

The data receiving unit 1940 is configured to receive the file data transmitted from the second electronic device.

In the above-described control apparatus applied to the first electronic device according to the disclosure, in the case that there is a trigger event for the first display content when the first electronic device displays the first display content via the first display unit based on the display data, the control information including the trigger position of the trigger event in the first display content is generated and transmitted to the second electronic device, and the file data transmitted by the second electronic device based on the control information are received, thereby enriching functions of the second electronic device and improving user experience.

In an embodiment, after receiving the file data transmitted from the second electronic device, the control apparatus may store the file data. In an embodiment, the structure of the control apparatus shown in FIG. 19 may be modified.

Figure 20:
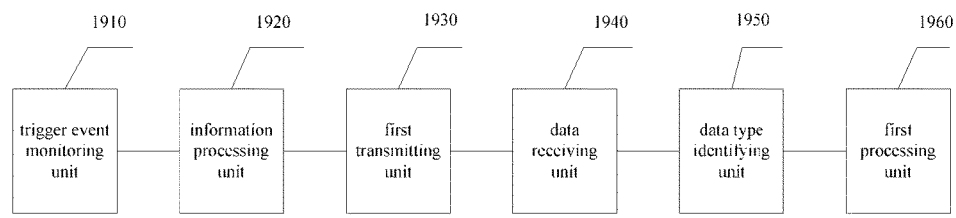
FIG. 20 is a schematic structural diagram of a control apparatus applied to a first electronic device according to an embodiment of the present disclosure.

Referring to FIG. 20, which is a schematic structural diagram of a control apparatus applied to a first electronic device according to an embodiment of the disclosure.

Compared with the control apparatus shown in FIG. 19, the control apparatus shown in FIG. 20 further includes a data type identifying unit 1950 and a first processing unit 1960. The functions of the data type identifying unit 1950 and the first processing unit 1960 are described, and the functions of other units may refer to the above relevant description. The data type identifying unit 1950 is configured to identify a type of the file data received by the data receiving unit 1940; and the first processing unit 1960 is configured to process the file data in accordance with a processing strategy corresponding to the type of the file data.

The first processing unit 1960 may include: a judging module, a first processing module connected to the judging module, and a second processing module connected to the judging module. The judging module is configured to judge whether the file data is capable of running by itself to obtain a first judgment result; the first processing module is configured to run the file data, in the case that the first judgment result indicates that the file data is capable of running by itself; the second processing module is configured to run an application corresponding to the file data and load the file data using the application, in the case that the first judgment result indicates that the file data is not capable of running by itself.

In the control apparatus applied to the first electronic device shown in FIG. 20, after the file data transmitted from the second electronic device is received, the type of the file data is identified, and the file data is processed in accordance with the processing strategy corresponding to the type of the file data. That is, after received the file data transmitted from the second electronic device, the first electronic device can process the file data automatically without manual operation.

In the control apparatuses applied to the first electronic device shown in FIG. 19 and FIG. 20, the trigger event monitoring unit 1910 may use many ways to monitor whether there is a trigger event for the first display content. Accordingly, the trigger event monitoring unit 1910 may be configured in various structures.

For example, the trigger event monitoring unit 1910 includes a first monitoring module. The first monitoring module is configured to monitor whether a drag operation is performed by an operator in a region where the first display content locates and whether an ending position of the drag operation locates outside the first display content.

For example, the trigger event monitoring unit 1910 includes a second monitoring module. The second monitoring module is configured to monitor whether an operator touches a region where the first display content locates and whether a duration of the touching operation reaches a first duration.

For example, the trigger event monitoring unit 1910 includes a third monitoring module. The third monitoring module is configured to monitor whether a click operation is performed by an operator in a region where the first display content locates and whether the number of the click operations meets a threshold.

It should be noted that the data receiving unit 1940 may use following way to receive the file data transmitted from the second electronic device. The file data transmitted from the second electronic device is received in a first transmission mode, and the first transmission mode is different from a second transmission mode for transmitting the display data. Different transmission modes are used for different types of data. Therefore, the speed and quality of the data transmission are improved. Furthermore, the data receiving unit 1940 may receive the file data transmitted from the second electronic device via a second data transmission channel. The second data transmission channel is different from a data transmission channel for transmitting the display data.

A control apparatus applied to a second electronic device is further provided according to the disclosure.

Figure 21:
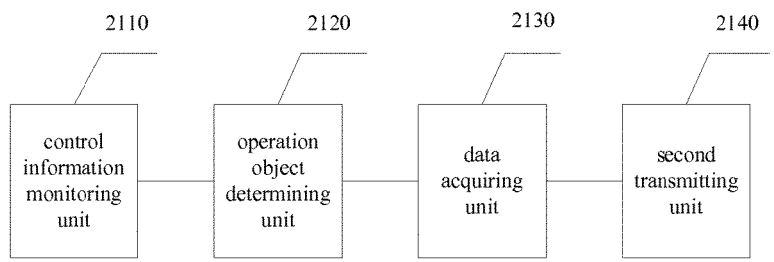
FIG. 21 is a schematic structural diagram of a control apparatus applied to a second electronic device according to an embodiment of the present disclosure.

Referring to FIG. 21, which is a schematic structural diagram of a control apparatus applied to a second electronic device according to an embodiment of the disclosure. The control apparatus includes: a control information monitoring unit 2110, an operation object determining unit 2120, a data acquiring unit 2130 and a second transmitting unit 2140.

The control information monitoring unit 2110 is configured to monitor whether control information transmitted from a first electronic device is received when the second electronic device transmits display data to a first electronic device, where the display data corresponds to a second display content in the second electronic device, the first electronic device outputs a first display content via a first display unit based on the display data, and the first display content is the same as the second display content.

The operation object determining unit 2120 is configured to, upon receiving control information, determine an operation object corresponding to a trigger event which generates the control information by parsing the control information.

The data acquiring unit 2130 is configured to acquire file data corresponding to the operation object.

The second transmitting unit 2140 configured to transmit the file data to the first electronic device.

In the above-described control apparatus applied to the second electronic device according to the disclosure, in the case that the control information transmitted from the first electronic device is received when the second electronic device transmits the display data to the first electronic device, the control information is parsed to determine the operation object corresponding to the trigger event which generates the control information, and the file data corresponding to the operation object is acquired and transmitted to the first electronic device, thereby enriching functions of the first electronic device.

Optionally, the second transmitting unit 2140 is configured to transmit the file data to the first electronic device via a second data transmission channel, where the second data transmission channel is different from a data transmission channel for transmitting the display data.

That is, two data transmission channels are established between the first electronic device and the second electronic device, where one data transmission channel is used to transmit the display data and the other data transmission channel is used to transmit the file data. Therefore, the impact on the transmission speed of the display data can be reduced when the second electronic device transmits the file data to the first electronic device.

Additionally, the second transmitting unit 2140 may transmit the file data to the first electronic device in a first transmission mode, and the first transmission mode is different from a second transmission mode for transmitting the display data. In an embodiment, UDP is used in the first transmission mode, and TCP is used in the second transmission mode.

An electronic device is further provided according to the disclosure. The electronic device includes a display unit and any one of the above-described control apparatuses according to the disclosure.

Optionally, the electronic device includes one of the above-described control apparatuses applied to the first electronic device, and one of the above-described control apparatuses applied to the second electronic device. In the mirror system, the electronic device may serve as a source electronic device, and may also serve as a target electronic device.

Figure 22:
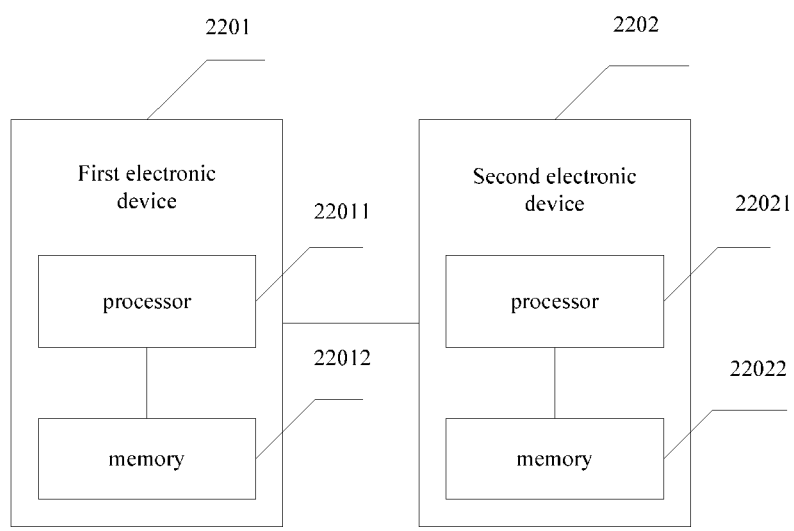
FIG. 22 is a schematic structural diagram of an electronic device according to an embodiment of the present application.

Reference is made to FIG. 22, which shows a flowchart of an electronic device. The electronic device includes one or more processors 2201 and a memory 2202 having processor-executable instructions stored therein, and the instructions when executed by the one or more processors 2201, configure the first electronic device 2202:

receive a trigger event performed on a mirror content displayed by the first electronic device, wherein the first electronic device is a mirror device of a mirror system;

generate control information according to the trigger event; and send the control information to a second electronic device, to make the second electronic device identifies a target object according to the control information and performs an operation on the target object, wherein the second electronic device is a source device of the mirror system.

Finally, it should be noted that, in the present disclosure, relational terms such as "first" and "second" are used only to distinguish one entity or operation from the other entity or operation, but not necessarily demand or imply that there is actual relation or order among those entities and operations. Furthermore, the terms "including", "containing", or any other variations thereof means a non-exclusive inclusion, so that the process, method, article or device that includes a series of elements includes not only these elements but also other elements that are not explicitly listed, or further includes elements inherent in the process, method, article or device. Moreover, when there is no further limitation, the element defined by the wording "include(s) a . . . " does not exclude the case that in the process, method, article or device that includes the element there are other same elements.

Various embodiments of the specification are described in a progressive way, each embodiment lays emphasis on the difference from other embodiments, and for the same or similar parts between various embodiments, one may refer to the description of other embodiments. For the device provided according to the embodiments, since the device corresponds to the method provided according to the embodiments, its description is simple, the related part may be referred to the description of the method embodiment.

The above description of the provided embodiments can enable those skilled in the art to implement or practice the present disclosure. Many changes to these embodiments are apparent for those skilled in the art, and general principles defined herein may be implemented in other embodiments without departing from the spirit or scope of the present disclosure. Hence, the present disclosure is not limited to the embodiments disclosed herein, but conforms to the widest scope in accordance with the principles and novel features provided herein.

The invention claimed is:

1. An electronic device control method, comprising:
   displaying, by a first electronic device, mirror content received from a second electronic device, wherein the first electronic device is a mirror device of a mirror system, and the second electronic device is a target sending device, source devices of the mirror system comprises the target sending device and one or more target receiving devices;
   detecting, by the first electronic device, a trigger event performed on the mirror content displayed by the first electronic device;
   acquiring, by the first electronic device, parameter information of the target sending device, parameter information of the one or more target receiving devices and storage address of a target object;
   generating, by the first electronic device, control information according to the trigger event by:
      generating first transmission information according to the trigger event, the storage address of the target object and the parameter information of the target sending device; and
      generating, second transmission information according to the trigger event, the storage address of the target object and the parameter information of the one or more target receiving devices; and
   sending, by the first electronic device, the control information to the target sending device and the one or more target receiving devices, to instruct establishment of a connection between the one or more target receiving devices and the target sending device and make the target sending device identify the target object according to the control information, perform an operation on the target object according to the control information, and send to the one or more target receiving devices a file data of the target object by using the connection and the storage address of the target object,
   wherein the sending the control information to the target sending device and the one or more target receiving devices comprises sending the second transmission information to the target sending device and sending the first transmission information to the one or more target receiving devices.

2. The method according to claim 1, further comprising:
   determining, by the first electronic device, one or more target devices from the source devices of the mirror system and the first electronic device.

3. The method according to claim 2, wherein in the case that the mirror system comprises one source device, the method further comprises:
   receiving, by the first electronic device, file data of the target object sent from the second electronic device.

4. The method according to claim 3, wherein the first electronic device receives the file data sent from the second electronic device in a first transmission mode, the first electronic device receives the mirror content sent from the second electronic device in a second transmission mode.

5. The method according to claim 2, wherein the determining, by the first electronic device, one or more target devices from the source devices of the mirror system and the mirror device, comprises:
   acquiring, by the first electronic device, coordinates of a starting position of the trigger event and coordinates of one or more ending positions of the trigger event in a display module of the first electronic device;
   determining a first preset region in the display module according to the coordinates of the starting position of the trigger event, determining the electronic device corresponding to the first preset region as the target sending device; and
   determining one or more second preset regions in the display module according to the coordinates of the one or more ending positions of the trigger event, determining one or more electronic devices corresponding to the second preset regions as one or more target receiving devices.

6. The method according to claim 5, further comprising:
   receiving, by the first electronic device, feedback information sent from the target sending device; and
   in the case that the feedback information indicates that the target object does not exist, and/or, the ending position of the trigger event is not within an effective region, generating adjusting information according to a first operation, wherein the adjusting information is used to instruct the first electronic device to adjust a position of the mirror content of the target sending device.

7. The method according to claim 5, further comprising:
   receiving, by the first electronic device, link information of the target object sent from the target sending device;
   generating, by the first electronic device, instruction information according to the link information of the target object; and
   sending, by the first electronic device, the instruction information to the one or more target receiving devices, to make the target receiving devices acquires file data of the target object.

8. An electronic device control method, comprising:
   sending, by a second electronic device, mirror content to a first electronic device to facilitate the first electronic device in displaying the mirror content;

receiving, by the second electronic device, control information sent from the first electronic device, wherein:
the control information is generated by the first electronic device according to a trigger event, wherein the trigger event is detected by the first electronic device and performed on the mirror content displayed by the first electronic device
the second electronic device is one of a plurality of source devices of a mirror system; and
the first electronic device is a mirror device of the mirror system;
identifying, by the second electronic device, a target object according to the control information;
sending, by the second electronic device, storage address of the target object and parameter information of the second electronic device to the first electronic device;
receiving, by the second electronic device, first transmission information sent from the first electronic device, wherein the first transmission information is generated by the first electronic device according to the storage address of the target object and parameter information of at least one target receiving device, the at least one target receiving device receives second transmission information sent from the first electronic device, and the second transmission information is generated according to the storage address of the target object and the parameter information of the second electronic device; and
performing, by the second electronic device, an operation on the target object according to the control information by:
establishing a connection with the at least one target receiving device according to the first transmission information and the second transmission information, and sending a file data of the target object to the at least one target receiving device by using the connection.

9. The method according to claim 8, wherein the identifying, by the second electronic device, the target object according to the control information, comprises:
determining, by the second electronic device, the target object according to a trigger position of the trigger event within the mirror content, wherein the trigger position is comprised in the control information.

10. The method according to claim 8, wherein performing, by the second electronic device, the operation on the target object according to the control information, comprises:
sending, by the second electronic device, file data of the target object to the first electronic device.

11. The method according to claim 10, wherein the second electronic device sends the file data of the target object to the first electronic device in a first transmission mode, and the second electronic device sends the mirror content to the first electronic device in a second transmission mode.

12. The method according to claim 8, wherein the performing, by the second electronic device, the operation on the target object according to the control information, comprises:
sending, by the second electronic device, link information of the target object to the first electronic device;
receiving, by the second electronic device, instruction information sent from the first electronic device, wherein the instruction information is generated by the first electronic device according to the link information of the target object; and
sending, by the second electronic device, file data of the target object to one or more target receiving devices according to the instruction information.

13. An electronic device, comprising one or more processor and a memory having processor-executable instructions stored therein, and the instructions when executed by the one or more processors, configure the electronic device to:
display mirror content received from a second electronic device, wherein the second electronic device is a target sending device, source devices of a mirror system comprises the target sending device and one or more target receiving devices;
detect a trigger event performed on the mirror content displayed by a first electronic device, wherein the first electronic device is a mirror device of the mirror system;
acquire parameter information of the target sending device, parameter information of the one or more target receiving devices and storage address of a target object;
generate control information according to the trigger event by:
generating first transmission information according to the trigger event, the storage address of the target object and the parameter information of the target sending device; and
generating second transmission information according to the trigger event, the storage address of the target object and the parameter information of the one or more target receiving devices, wherein the first transmission information and the second transmission information is used to instruct establishment of a connection between the one or more target receiving devices and the target sending device;
send the control information to the target sending device and the one or more target receiving devices; and
make the target sending device identify the target object according to the control information, perform an operation on the target object according to the control information, and send to the one or more target receiving devices a file data of the target object by using the connection and the storage address of the target object,
wherein sending the control information to the target sending device and the one or more target receiving devices comprises sending the second transmission information to the target sending device and sending the first transmission information to the one or more target receiving devices.

14. The electronic device according to claim 13, wherein the electronic device determines one or more target devices from the mirror device and the source devices.

15. The electronic device according to claim 14, wherein in the case that the mirror system comprises one source device, the electronic device receives file data of the target object sent from the source device.

16. The electronic device according to claim 14, wherein
the electronic device acquires coordinates of a starting position of the trigger event and coordinates of one or more ending positions of the trigger event in a display module of the first electronic device;
the electronic device determines a first preset region in the display module according to the coordinates of the starting position of the trigger event, determines the source devices corresponding to the first preset region as the target sending device; and
the electronic device determines one or more second preset regions in the display module according to the one or more coordinates of the ending positions of the trigger event, determines one or more source devices corresponding to the second preset region as one or more target receiving devices.

17. The electronic device according to claim 16, wherein the electronic device receives link information of the target object sent from the target sending device;

the electronic device generates instruction information according to the link information of the target object; and the electronic device sends the instruction information to the one or more target receiving devices, to instruct the one or more target receiving devices to acquire file data of the target object.

* * * * *